United States Patent
Hsueh et al.

(10) Patent No.: US 10,627,602 B2
(45) Date of Patent: Apr. 21, 2020

(54) IMAGE CAPTURING LENS ASSEMBLY, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 24 days.

(21) Appl. No.: 15/436,980

(22) Filed: Feb. 20, 2017

(65) Prior Publication Data
US 2018/0074294 A1    Mar. 15, 2018

(30) Foreign Application Priority Data
Sep. 12, 2016 (TW) .............................. 105129622 A

(51) Int. Cl.
G02B 13/00 (2006.01)
G02B 9/62 (2006.01)
G02B 27/00 (2006.01)

(52) U.S. Cl.
CPC ..... *G02B 13/0045* (2013.01); *G02B 27/0025* (2013.01); *G02B 9/62* (2013.01)

(58) Field of Classification Search
CPC .............................. G02B 13/0045; G02B 9/62
USPC .................. 359/713, 756, 757, 759
See application file for complete search history.

(56) References Cited

U.S. PATENT DOCUMENTS

| | | | |
|---|---|---|---|
| 8,335,043 B2 | 12/2012 | Huang | |
| 8,385,006 B2 | 2/2013 | Tsai et al. | |
| 8,891,177 B2 | 11/2014 | Huang | |
| 8,908,290 B1 | 12/2014 | Liao et al. | |
| 8,934,178 B2 | 1/2015 | Tang et al. | |
| 9,036,272 B2 | 5/2015 | Huang | |
| 9,083,885 B1 | 7/2015 | Chen et al. | |
| 9,316,811 B2 | 4/2016 | Chen | |
| 9,904,036 B1 | 2/2018 | Chen et al. | |
| 2013/0215520 A1 | 8/2013 | Lai et al. | |
| 2014/0211325 A1 | 7/2014 | Lai | |
| 2015/0085135 A1 | 3/2015 | Chen et al. | |
| 2015/0338614 A1 | 11/2015 | Tang et al. | |
| 2015/0362702 A1 | 12/2015 | Tang et al. | |
| 2016/0004050 A1 | 1/2016 | Tang et al. | |
| 2016/0041369 A1 | 2/2016 | Tang et al. | |

(Continued)

FOREIGN PATENT DOCUMENTS

CN    102692694 B    2/2014
CN    102749788 B    1/2015

(Continued)

*Primary Examiner* — Marin Pichler
(74) *Attorney, Agent, or Firm* — McClure, Qualey & Rodack, LLP

(57) ABSTRACT

An image capturing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The fifth lens element has an object-side surface being convex in a paraxial region thereof. The sixth lens element with negative refractive power has an image-side surface being concave in a paraxial region thereof and includes at least one convex shape in an off-axial region thereof.

27 Claims, 21 Drawing Sheets

(56) References Cited

U.S. PATENT DOCUMENTS

| | | |
|---|---|---|
| 2016/0097916 A1 | 4/2016 | Tang et al. |
| 2016/0103300 A1 | 4/2016 | Tang et al. |
| 2016/0124184 A1 | 5/2016 | Tang et al. |
| 2016/0131872 A1 | 5/2016 | Tang et al. |
| 2016/0231533 A1 | 8/2016 | Mercado |
| 2016/0341934 A1 | 11/2016 | Mercado |

FOREIGN PATENT DOCUMENTS

| | | |
|---|---|---|
| WO | 2016130302 A2 | 8/2016 |
| WO | 2016186730 A1 | 11/2016 |

IMAGE CAPTURING LENS ASSEMBLY, IMAGE CAPTURING APPARATUS AND ELECTRONIC DEVICE

RELATED APPLICATIONS

This application claims priority to Taiwan Application Serial Number 105129622, filed Sep. 12, 2016, which is herein incorporated by reference.

BACKGROUND

Technical Field

The present disclosure relates to an image capturing lens assembly and an image capturing apparatus. More particularly, the present disclosure relates to an image capturing lens assembly and an image capturing apparatus with a compact size applicable to electronic devices.

Description of Related Art

With personal electronic products became compact gradually, sizes of components therein are reduced, resulting in the rise of miniaturized imaging lens assemblies, and demands of miniaturized imaging lens assemblies with favorable image quality are thus increased. Moreover, in order to obtain sufficient illumination of image surface of imaging lens assemblies, characteristic of large aperture is one of the essential factors currently. Therefore, in the future, imaging lens assemblies with large aperture, compactness and high image quality can satisfy market specifications and demands, and the applications can include: general mobile devices, various intelligent devices, portable electronic devices, portable video recorder, multiple lens assemblies devices, wearable devices etc.

SUMMARY

According to one aspect of the present disclosure, an image capturing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. A fifth lens element has an object-side surface being convex in a paraxial region thereof. A sixth lens element with negative refractive power has an image-side surface being concave in a paraxial region thereof and including at least one convex shape in an off-axial region thereof. The image capturing lens assembly has a total of six lens elements. When a refractive index of the sixth lens element is N6, a curvature radius of an object-side surface of the sixth lens element is R11, a curvature radius of the image-side surface of the sixth lens element is R12, a refractive power of the second lens element is P2, a refractive power of the third lens element is P3, a refractive power of the fourth lens element is P4, and a refractive power of the fifth lens element is P5, the following conditions are satisfied:

$1.60 < N6 < 1.77;$ $-0.40 < (R11+R12)/(R11-R12) < 7.50;$ and $\Sigma |Pi| < 2.0$, wherein $i=2,3,4,5$.

According to another aspect of the present disclosure, an image capturing apparatus includes the image capturing lens assembly of the aforementioned aspect and an image sensor, wherein the image sensor is disposed on an image surface of the image capturing lens assembly.

According to yet another aspect of the present disclosure, an electronic device includes the image capturing apparatus of the aforementioned aspect.

According to one aspect of the present disclosure, an image capturing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The sixth lens element with negative refractive power has an image-side surface being concave in a paraxial region thereof and including at least one convex shape in an off-axial region thereof. The image capturing lens assembly has a total of six lens elements. When a refractive index of the sixth lens element is N6, a curvature radius of an object-side surface of the sixth lens element is R11, a curvature radius of the image-side surface of the sixth lens element is R12, a refractive power of the first lens element is P1, a refractive power of the second lens element is P2, a refractive power of the third lens element is P3, a refractive power of the fourth lens element is P4, a refractive power of the fifth lens element is P5, and a refractive power of the sixth lens element is P6, the following conditions are satisfied:

$1.60 < N6 < 1.77;$ $-0.70 < (R11+R12)/(R11-R12) < 7.50;$ and $|Pi| < |P1|$ and $|Pi| < |P6|$, wherein $i=2,3,4,5$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
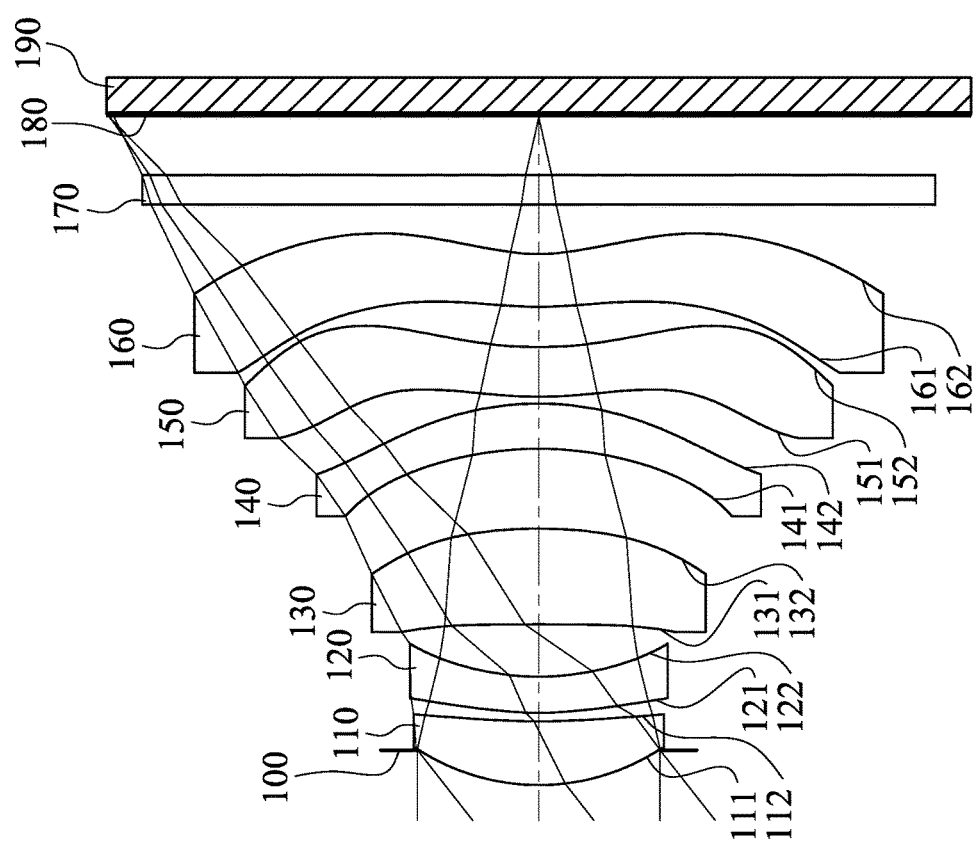
FIG. 1 is a schematic view of an image capturing apparatus according to the 1st embodiment of the present disclosure.

An image capturing lens assembly includes, in order from an object side to an image side, a first lens element, a second lens element, a third lens element, a fourth lens element, a fifth lens element and a sixth lens element, wherein the image capturing lens assembly has a total of six lens elements.

The first lens element with positive refractive power has an object-side surface being convex in a paraxial region thereof. Therefore, the sufficient light converging ability of the image capturing lens assembly can be provided, and the positive refractive power can be adjusted so as to reduce the total track length thereof.

The second lens element can have an image-side surface being concave in a paraxial region thereof, so that aberrations of the image capturing lens assembly can be corrected, and it is favorable for arranging other optical mechanism elements between the second lens element and the third lens element so as to enhance the image quality.

The third lens element can include at least one inflection point, so that aberrations on the object side of the image capturing lens assembly can be corrected with the corresponding shape of the image-side surface of the second lens element so as to optimize the image quality.

The fourth lens element can have an object-side surface being concave in a paraxial region thereof and an image-side surface being convex in a paraxial region thereof. Therefore, astigmatism can be corrected and the symmetrical property of the image capturing lens assembly can be strengthened for reducing the sensitivity.

The fifth lens element can have an object-side surface being convex in a paraxial region thereof so as to maintain the compact size of the image capturing lens assembly as well as correcting aberrations thereof. Furthermore, the fifth lens element can have an image-side surface including at least two inflection points from a paraxial region thereof to an off-axial region thereof. Therefore, it is favorable for imaging the off-axial light on the image surface by reducing off-axial aberrations effectively.

The sixth lens element with negative refractive power has an image-side surface being concave in a paraxial region thereof and including at least one convex shape in an off-axial region thereof. Therefore, the back focal length can be reduced by positioning the principal point of the image capturing lens assembly closer to the object side, and the resolution of the off-axial image can be increased by correcting aberrations and reducing the incident angle of the off-axial field of view on the image sensor. Furthermore, the sixth lens element can have an object-side surface including at least one inflection point. Therefore, off-axial aberrations can be corrected and the total track length of the image capturing lens assembly can be reduced.

When a refractive index of the sixth lens element is N6, the following condition is satisfied: $1.60<N6<1.77$. Therefore, by the arrangement of the material with the specific refractive index of the sixth lens element, the effective diameter of the lens element can be controlled for further reducing the outer diameter of the lens barrel which is for containing the image capturing lens assembly, and the brightness of the image and the compactness can be balanced so as to increase flexibility of mechanism design.

When a curvature radius of the object-side surface of the sixth lens element is R11, and a curvature radius of the image-side surface of the sixth lens element is R12, the following condition is satisfied: $-0.70<(R11+R12)/(R11-R12)<7.50$. Therefore, it is favorable for controlling the back focal length of the image capturing lens assembly by adjusting the curvature distribution of the sixth lens element effectively so as to reduce the total track length. Preferably, the following condition can be satisfied: $-0.40<(R11+R12)/(R11-R12)<7.50$. More preferably, the following condition can be satisfied: $0<(R11+R12)/(R11-R12)<3.50$.

When a refractive power of the second lens element is P2, a refractive power of the third lens element is P3, a refractive power of the fourth lens element is P4, and a refractive power of the fifth lens element is P5, the following condition is satisfied: $\Sigma|Pi|<2.0$, wherein $i=2, 3, 4, 5$. Therefore, it is favorable for adjusting the refractive power of the lens elements located in the middle of the image capturing lens assembly, so that aberrations in the middle of the image capturing lens assembly can be further corrected and the sensitivity can be reduced. Preferably, the following condition can be satisfied: $\Sigma|Pi|<1.65$, wherein $i=2, 3, 4, 5$. More preferably, the following condition can be satisfied: $\Sigma|Pi|<1.20$, wherein $i=2, 3, 4, 5$.

When a refractive power of the first lens element is P1, the refractive power of the second lens element is P2, the refractive power of the third lens element is P3, the refractive power of the fourth lens element is P4, the refractive power of the fifth lens element is P5, and a refractive power of the sixth lens element is P6, the following condition is satisfied: $|Pi|<|P1|$ and $|Pi|<|P6|$, wherein $i=2, 3, 4, 5$. Therefore, it is favorable for controlling the arrangement of the refractive power among the lens elements, so that the efficiency of space utilization of the image capturing lens assembly can be increased so as to reduce the total track length. Specifically, P1 is a ratio value of the focal length of the image capturing lens assembly and the focal length of the first lens element, P2 is a ratio value of the focal length of the image capturing lens assembly and the focal length of the second lens element, P3 is a ratio value of the focal length of the image capturing lens assembly and the focal length of the third lens element, P4 is a ratio value of the focal length of the image capturing lens assembly and the focal length of the fourth lens element, P5 is a ratio value of the focal length of the image capturing lens assembly and the focal length of the fifth lens element, and P6 is a ratio value of the focal length of the image capturing lens assembly and the focal length of the sixth lens element.

When a central thickness of the first lens element is CT1, a central thickness of the second lens element is CT2, a central thickness of the third lens element is CT3, a central thickness of the fourth lens element is CT4, a central thickness of the fifth lens element is CT5, and a central thickness of the sixth lens element is CT6, the following conditions are satisfied: CT2<CT1; CT3<CT1; CT4<CT1; CT5<CT1; and CT6<CT1. Therefore, it is favorable for improving surface reflection by adjusting the thickness of the first lens element so as to enhance the image quality.

When a sum of central thicknesses of the lens elements of the image capturing lens assembly is ΣCT, and a sum of axial distances between every two of the lens elements of the image capturing lens assembly that are adjacent to each other is ΣAT, the following condition is satisfied: 1.30<ΣCT/ΣAT<3.10. Therefore, it is favorable for assembling the image capturing lens assembly and reducing the sensitivity by properly distributing the proportion of the lens elements therein. Preferably, the following condition can be satisfied: 1.30<ΣCT/ΣAT<2.20.

When the central thickness of the first lens element is CT1, the central thickness of the second lens element is CT2, the central thickness of the third lens element is CT3, the central thickness of the fourth lens element is CT4, the central thickness of the fifth lens element is CT5, the central thickness of the sixth lens element is CT6, a maximum of CT1, CT2, CT3, CT4, CT5 and CT6 is CTmax, and a minimum of CT1, CT2, CT3, CT4, CT5 and CT6 is CTmin, the following condition is satisfied: 2.65<CTmax/CTmin<10.0. Therefore, it is favorable for avoiding the unbalanced space arrangement of the lens elements which may affect the image quality. Preferably, the following condition can be satisfied: 2.90<CTmax/CTmin<7.0.

When the central thickness of the second lens element is CT2, and the central thickness of the fifth lens element is CT5, the following condition is satisfied: 1.25<CT5/CT2<4.50. Therefore, it is favorable for the molding of the lens elements by controlling the ratio of thicknesses of the second lens element and the fifth lens element, so that the generated stress of the lens elements can be reduced so as to enhance the image quality.

When an axial distance between the second lens element and the third lens element is T23, and the central thickness of the fourth lens element is CT4, the following condition is satisfied: 0.45<T23/CT4<1.81. Therefore, it is favorable for moldability and homogeneity of the lens elements and increasing the yield rate of assembling by controlling the distance between the second lens element and the third lens element and the thickness of the fourth lens element. Preferably, the following condition can be satisfied: 0.55<T23/CT4<1.35.

When an axial distance between the object-side surface of the first lens element and the image surface is TL, and a maximum image height of the image capturing lens assembly is ImgH, the following condition is satisfied: TL/ImgH<1.75. Therefore, the imaging range can be enlarged, and the total track length of the image capturing lens assembly can be reduced.

When an Abbe number of the first lens element is V1, and an Abbe number of the sixth lens element is V6, the following condition is satisfied: 2.0<V1/V6<4.0. Therefore, it is favorable for converging light of different wavelengths so as to avoid the image overlay by adjusting materials of the lens elements on both the object side and the image side of the image capturing lens assembly.

When the Abbe number of the sixth lens element is V6, a focal length of the image capturing lens assembly is f, and an entrance pupil diameter of the image capturing lens assembly is EPD, the following condition is satisfied: 15.0<V6×(f/EPD)<60.0. Therefore, it is favorable for obtaining large aperture and favorable image quality by balancing the size of aperture and the material of the sixth lens element. Preferably, the following condition can be satisfied: 20.0<V6×(f/EPD)<50.0.

When the axial distance between the second lens element and the third lens element is T23, and an axial distance between the third lens element and the fourth lens element is T34, the following condition is satisfied: 0.55<T34/T23<5.50. Therefore, it is favorable for assembling of the image capturing lens assembly by balancing the distances among the lens elements on the object side of the image capturing lens assembly.

When a displacement in parallel with an optical axis from an axial vertex on an object-side surface of the fourth lens element to a maximum effective radius position on the object-side surface of the fourth lens element is SAG41, and a displacement in parallel with the optical axis from an axial vertex on an image-side surface of the fifth lens element to a maximum effective radius position on the image-side surface of the fifth lens element is SAG52, the following condition is satisfied: 0.10<|SAG52/SAG41|<3.20. Therefore, aberrations of the image capturing lens assembly can be corrected effectively for enhancing the image quality by adjusting the surface shape of the object-side surface of the fourth lens element and the image-side surface of the fifth lens element. Preferably, the following condition can be satisfied: 0.10<|SAG52/SAG41|<1.80.

When a displacement in parallel with an optical axis from an axial vertex on the image-side surface of the sixth lens element to a maximum effective radius position on the image-side surface of the sixth lens element is SAG62, and the central thickness of the sixth lens element is CT6, the following condition is satisfied: −3.0<SAG62/CT6<−1.0. Therefore, it is favorable for obtaining the compact size of the image capturing lens assembly and reducing the back focal length thereof by controlling the shape variation of the paraxial region and the off-axial region of the sixth lens element.

When the Abbe number of the sixth lens element is V6, and the refractive index of the sixth lens element is N6, the following condition is satisfied: 7.0<V6/N6<15.0. Therefore, it is favorable for reducing the total track length of the image capturing lens assembly by appropriately arranging the material of the sixth lens element.

When a curvature radius of an object-side surface of the third lens element is R5, and a curvature radius of an object-side surface of the fifth lens element is R9, the following condition is satisfied: −0.20<R9/R5<2.50. Therefore, it is favorable for enhancing the aberration correcting ability of image capturing lens assembly and optimizing the image quality by adjusting the curvatures of the object-side surface of the third lens element and the object-side surface of the fifth lens element.

When the refractive index of the sixth lens element is N6, and half of a maximum field of view of the image capturing lens assembly is HFOV, the following condition is satisfied: 64.0 degrees<N6×HFOV<80.0 degrees. Therefore, the material of the sixth lens element and the field of view of the image capturing lens assembly can be balanced, so that the image capturing lens assembly can obtain the characteristics of shortened total track length and enough imaging range.

When an Abbe number of the second lens element is V2, and an Abbe number of the fourth lens element is V4, the following condition is satisfied: (V2+V4)/2<30.0. Therefore, chromatic aberration of the image capturing lens assembly can be corrected for enhancing the image quality.

When the focal length of the image capturing lens assembly is f, and the entrance pupil diameter of the image capturing lens assembly is EPD, the following condition is satisfied: f/EPD<2.0. Therefore, it is favorable for increasing the illumination of the image surface by controlling the amount of light into the image capturing lens assembly.

According to the image capturing lens assembly of the present disclosure, the lens elements thereof can be made of glass or plastic materials. When the lens elements are made of glass materials, the distribution of the refractive power of the image capturing lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing lens assembly. Therefore, the total track length of the image capturing lens assembly can also be reduced.

According to the image capturing lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof. According to the image capturing lens assembly of the present disclosure, the refractive power or the focal length of a lens element being positive or negative may refer to the refractive power or the focal length in a paraxial region of the lens element.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, the image surface of the image capturing lens assembly, based on the corresponding image sensor, can be flat or curved. In particular, the image surface can be a curved surface being concave facing towards the object side.

According to the image capturing lens assembly of the present disclosure, an aperture stop can be configured as a front stop or a middle stop. A front stop disposed between an object and the first lens element can provide a longer distance between an exit pupil of the image capturing lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the image capturing lens assembly and thereby provides a wider field of view for the same.

According to the image capturing lens assembly of the present disclosure, the image capturing lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing apparatus is provided. The image capturing apparatus includes the aforementioned image capturing lens assembly and an image sensor, wherein the image sensor is disposed on the image side of the aforementioned image capturing lens assembly, that is, the image sensor can be disposed on or near the image surface of the aforementioned image capturing lens assembly. By the proper arrangement of the lens elements, it is favorable for widening the utilization by obtaining characteristics of large aperture, compactness and high image quality. Preferably, the image capturing apparatus can further include a barrel member, a holder member or a combination thereof.

According to the present disclosure, an electronic device is provided, which includes the aforementioned image capturing apparatus. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
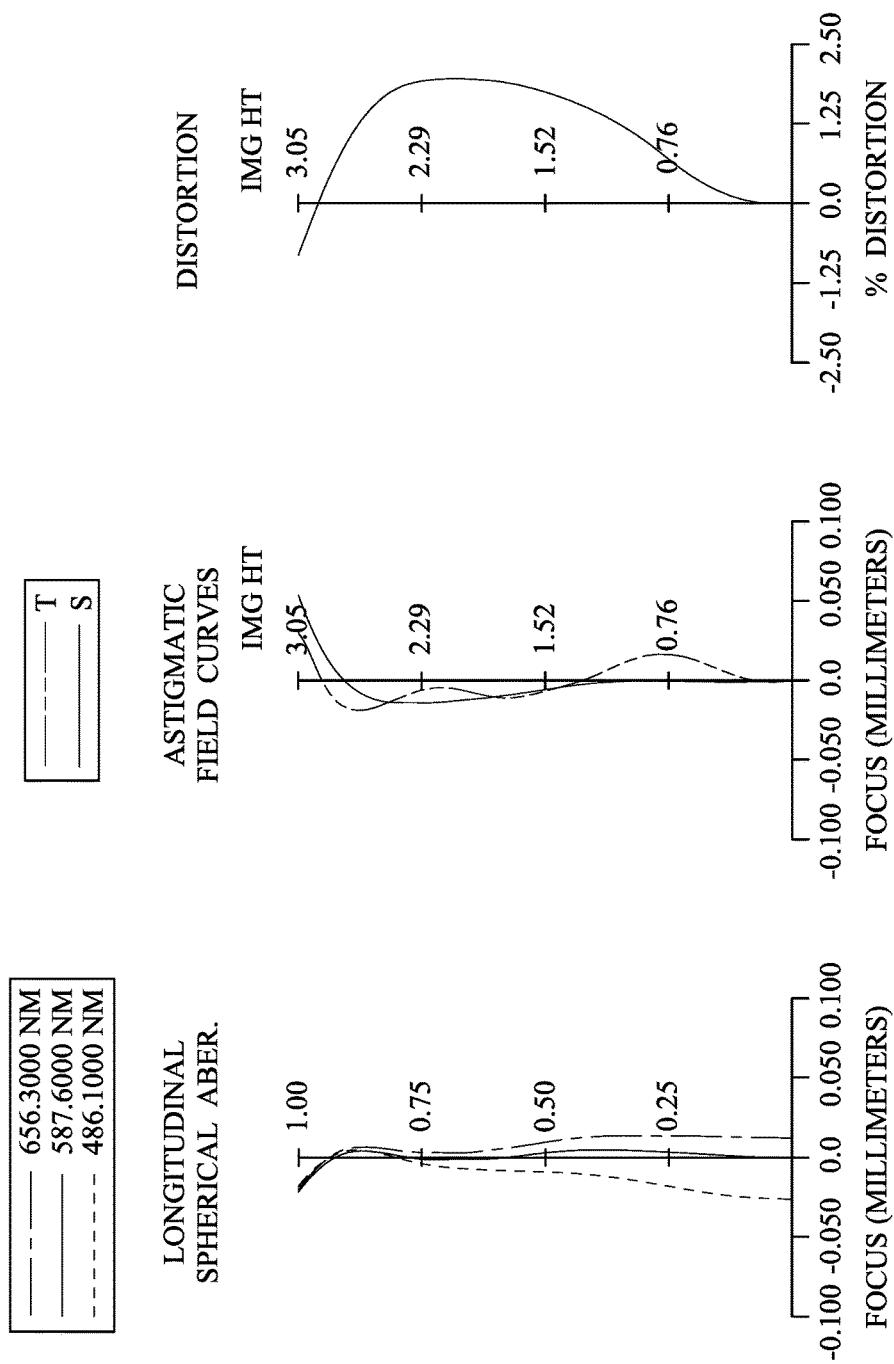
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes an image capturing lens assembly (its reference numeral is omitted) and an image sensor 190. The image capturing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the image capturing lens assembly. The image capturing lens assembly has a total of six lens elements (110-160).

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the image-side surface 152 of the fifth lens element 150 includes at least two inflection points from the paraxial region thereof to an off-axial region thereof; in detail, according to the 1st embodiment, the image-side surface 152 of the fifth lens element 150 includes two inflection points from the paraxial region thereof to the off-axial region thereof.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axial region thereof, and the object-side surface 161 of the sixth lens element 160 includes at least one inflection point.

The IR-cut filter 170 is made of a glass material and located between the sixth lens element 160 and the image surface 180, and will not affect the focal length of the image capturing lens assembly.

The equation of the aspheric surface profiles of the aforementioned lens elements of the 1st embodiment is expressed as follows:

$$X(Y) = (Y^2/R)/\left(1 + \text{sqrt}\left(1 - (1+k) \times (Y/R)^2\right)\right) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of a maximum field of view of the image capturing lens assembly is HFOV, these parameters have the following values: f=3.93 mm; Fno=2.29; and HFOV=38.0 degrees.

In the image capturing lens assembly according to the 1st embodiment, when a refractive index of the sixth lens element 160 is N6, the following condition is satisfied: N6=1.695.

In the image capturing lens assembly according to the 1st embodiment, when the refractive index of the sixth lens element 160 is N6, and the half of a maximum field of view of the image capturing lens assembly is HFOV, the following condition is satisfied: N6×HFOV=64.44 degrees.

In the image capturing lens assembly according to the 1st embodiment, when the refractive index of the sixth lens element 160 is N6, and an Abbe number of the sixth lens element 160 is V6, the following condition is satisfied: V6/N6=11.27.

In the image capturing lens assembly according to the 1st embodiment, when an Abbe number of the first lens element 110 is V1, and the Abbe number of the sixth lens element 160 is V6, the following condition is satisfied: V1/V6=2.93.

In the image capturing lens assembly according to the 1st embodiment, when the Abbe number of the sixth lens element 160 is V6, the focal length of the image capturing lens assembly is f, and an entrance pupil diameter of the image capturing lens assembly is EPD, the following condition is satisfied: V6×(f/EPD)=43.74.

In the image capturing lens assembly according to the 1st embodiment, when an Abbe number of the second lens element 120 is V2, and an Abbe number of the fourth lens element 140 is V4, the following condition is satisfied: (V2+V4)/2=21.95.

In the image capturing lens assembly according to the 1st embodiment, when a central thickness of the second lens element 120 is CT2, and a central thickness of the fifth lens element 150 is CT5, the following condition is satisfied: CT5/CT2=1.37.

In the image capturing lens assembly according to the 1st embodiment, when an axial distance between the second lens element 120 and the third lens element 130 is T23, and a central thickness of the fourth lens element 140 is CT4, the following condition is satisfied: T23/CT4=1.16.

In the image capturing lens assembly according to the 1st embodiment, when the axial distance between the second lens element 120 and the third lens element 130 is T23, and an axial distance between the third lens element 130 and the fourth lens element 140 is T34, the following condition is satisfied: T34/T23=1.52.

In the image capturing lens assembly according to the 1st embodiment, when a central thickness of the first lens element 110 is CT1, the central thickness of the second lens element 120 is CT2, a central thickness of the third lens element 130 is CT3, the central thickness of the fourth lens element 140 is CT4, the central thickness of the fifth lens element 150 is CT5, a central thickness of the sixth lens element 160 is CT6, a sum of central thicknesses of the lens elements of the image capturing lens assembly is ΣCT (that is, ΣCT=CT1+CT2+CT3+CT4+CT5+CT6), an axial distance between the first lens element 110 and the second lens element 120 is T12, the axial distance between the second lens element 120 and the third lens element 130 is T23, the axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and a sum of axial distances between every two of the lens elements of the image capturing lens assembly that are adjacent to each other is ΣAT (that is, ΣAT=T12+T23+T34+T45+T56), the following condition is satisfied: ΣCT/ΣAT=1.82.

In the image capturing lens assembly according to the 1st embodiment, when the central thickness of the first lens element 110 is CT1, the central thickness of the second lens element 120 is CT2, the central thickness of the third lens element 130 is CT3, the central thickness of the fourth lens element 140 is CT4, the central thickness of the fifth lens element 150 is CT5, the central thickness of the sixth lens element 160 is CT6, a maximum of CT1, CT2, CT3, CT4, CT5 and CT6 is CTmax, and a minimum of CT1, CT2, CT3, CT4, CT5 and CT6 is CTmin, the following condition is satisfied: CTmax/CTmin=2.65.

In the image capturing lens assembly according to the 1st embodiment, when an axial distance between the object-side surface 111 of the first lens element 110 and the image surface 180 is TL, and a maximum image height of the image capturing lens assembly is ImgH, the following condition is satisfied: TL/ImgH=1.56.

In the image capturing lens assembly according to the 1st embodiment, when a curvature radius of the object-side surface 161 of the sixth lens element 160 is R11, and a curvature radius of the image-side surface 162 of the sixth lens element 160 is R12, the following condition is satisfied: (R11+R12)/(R11−R12)=3.24.

In the image capturing lens assembly according to the 1st embodiment, when a curvature radius of the object-side surface 131 of the third lens element 130 is R5, and a curvature radius of the object-side surface 151 of the fifth lens element 150 is R9, the following condition is satisfied: R9/R5=−0.04.

In the image capturing lens assembly according to the 1st embodiment, when a refractive power of the second lens element 120 is P2 (which is f/f2, a ratio value of the focal length of the image capturing lens assembly f and the focal length of the second lens element f2), a refractive power of the third lens element 130 is P3 (which is f/f3, a ratio value of the focal length of the image capturing lens assembly f and the focal length of the third lens element f3), a refractive power of the fourth lens element 140 is P4 (which is f/f4, a ratio value of the focal length of the image capturing lens assembly f and the focal length of the fourth lens element f4), and a refractive power of the fifth lens element 150 is P5 (which is f/f5, a ratio value of the focal length of the image capturing lens assembly f and the focal length of the fifth lens element f5), the following condition is satisfied: Σ|Pi|=1.06, wherein i=2, 3, 4, 5 (that is, Σ|Pi|=|P2|+|P3|+|P4|+|P5|).

Figure 17:
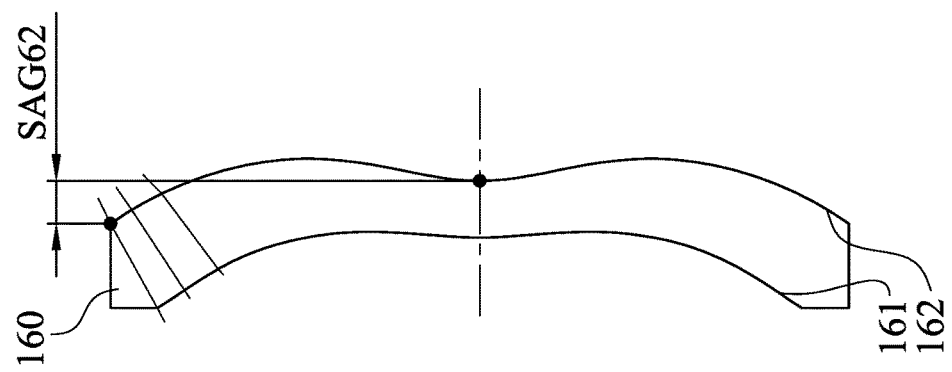
FIG. 17 is a schematic view of a parameter SAG62 according to the 1st embodiment of FIG. 1.

FIG. 17 is a schematic view of a parameter SAG62 according to the 1st embodiment of FIG. 1. In FIG. 17, when a displacement in parallel with an optical axis from an axial vertex on the image-side surface 162 of the sixth lens element 160 to a maximum effective radius position on the image-side surface 162 of the sixth lens element 160 is SAG62 (when the direction from the axial vertex on the image-side surface of the sixth lens element to the maximum effective radius position on the image-side surface of the sixth lens element is facing towards the image side, SAG62 is positive; when the direction from the axial vertex on the image-side surface of the sixth lens element to the maximum effective radius position on the image-side surface of the sixth lens element is facing towards the object side, SAG62 is negative), and the central thickness of the sixth lens element 160 is CT6, the following condition is satisfied: SAG62/CT6=−0.76.

Figure 18:
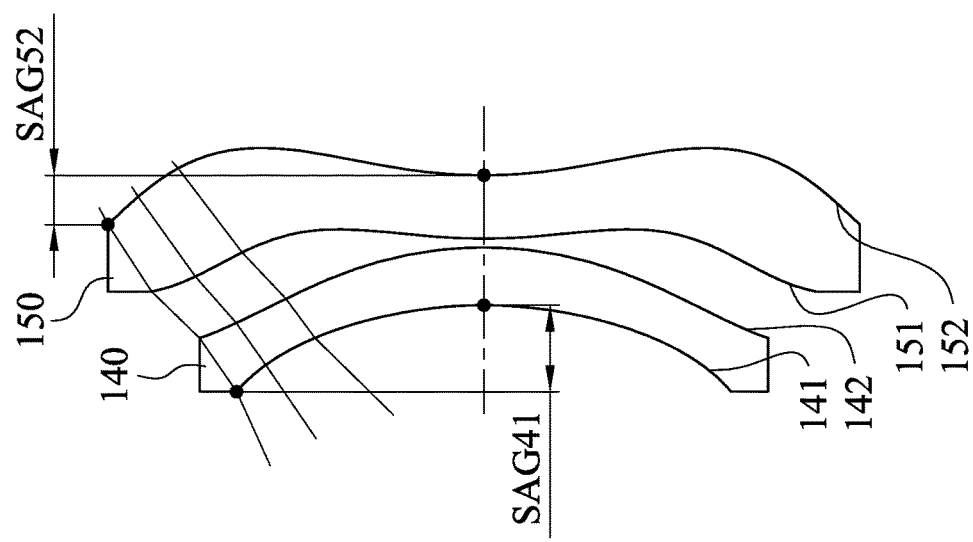
FIG. 18 is a schematic view of parameters SAG52 and SAG41 according to the 1st embodiment of FIG. 1.

FIG. 18 is a schematic view of parameters SAG52 and SAG41 according to the 1st embodiment of FIG. 1. In FIG. 18, when a displacement in parallel with an optical axis from an axial vertex on the object-side surface 141 of the fourth lens element 140 to a maximum effective radius position on the object-side surface 141 of the fourth lens element 140 is SAG41 (when the direction from the axial vertex on the object-side surface of the fourth lens element to the maximum effective radius position on the object-side surface of the fourth lens element is facing towards the image side, SAG41 is positive; when the direction from the axial vertex on the object-side surface of the fourth lens element to the maximum effective radius position on the object-side surface of the fourth lens element is facing towards the object side, SAG41 is negative), and a displacement in parallel with the optical axis from an axial vertex on the image-side surface 152 of the fifth lens element 150 to a maximum effective radius position on the image-side surface 152 of the fifth lens element 150 is SAG52 (when the direction from the axial vertex on the image-side surface of the fifth lens element to the maximum effective radius position on the image-side surface of the fifth lens element is facing towards the image side, SAG52 is positive; when the direction from the axial vertex on the image-side surface of the fifth lens element to the maximum effective radius position on the image-side surface of the fifth lens element is facing towards the object side, SAG52 is negative), the following condition is satisfied: |SAG52/SAG41|=0.57.

In the image capturing lens assembly according to the 1st embodiment, when the focal length of the image capturing lens assembly is f, and the entrance pupil diameter of the image capturing lens assembly is EPD, the following condition is satisfied: f/EPD=2.29.

In the image capturing lens assembly according to the 1st embodiment, when a refractive power of the first lens element 110 is P1 (which is f/f1, a ratio value of the focal length of the image capturing lens assembly f and the focal length of the first lens element f1), the refractive power of the second lens element 120 is P2, the refractive power of the third lens element is P3, the refractive power of the fourth lens element 140 is P4, the refractive power of the fifth lens element 150 is P5, and a refractive power of the sixth lens element 160 is P6 (which is f/f6, a ratio value of the focal length of the image capturing lens assembly f and the focal length of the sixth lens element f6), the following condition is satisfied: |Pi|<|P1| and |Pi|<|P6|, wherein i=2, 3, 4, 5.

The detailed optical data of the 1st embodiment are shown in Table 1 and the aspheric surface data are shown in Table 2 below.

TABLE 1

1st Embodiment
f = 3.93 mm, Fno = 2.29, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.249 | | | | |
| 2 | Lens 1 | 1.590 | ASP | 0.451 | Plastic | 1.544 | 55.9 | 4.52 |
| 3 | | 4.050 | ASP | 0.061 | | | | |

TABLE 1-continued

1st Embodiment
f = 3.93 mm, Fno = 2.29, HFOV = 38.0 deg.

| Surface # | | Curvature Radius | | Thickness | Material | Index | Abbe # | Focal Length |
|---|---|---|---|---|---|---|---|---|
| 4 | Lens 2 | 2.310 | ASP | 0.256 | Plastic | 1.660 | 20.4 | −14.41 |
| 5 | | 1.777 | ASP | 0.372 | | | | |
| 6 | Lens 3 | −75.679 | ASP | 0.679 | Plastic | 1.544 | 55.9 | 6.43 |
| 7 | | −3.354 | ASP | 0.566 | | | | |
| 8 | Lens 4 | −2.478 | ASP | 0.320 | Plastic | 1.639 | 23.5 | 29.37 |
| 9 | | −2.299 | ASP | 0.050 | | | | |
| 10 | Lens 5 | 3.203 | ASP | 0.351 | Plastic | 1.544 | 55.9 | −98.31 |
| 11 | | 2.905 | ASP | 0.285 | | | | |
| 12 | Lens 6 | 2.762 | ASP | 0.375 | Plastic | 1.695 | 19.1 | −5.06 |
| 13 | | 1.461 | ASP | 0.350 | | | | |
| 14 | IR-cut filter | Plano | | 0.210 | Glass | 1.517 | 64.2 | — |
| 15 | | Plano | | 0.429 | | | | |
| 16 | Image | Plano | | — | | | | |

Reference wavelength is 587.6 nm (d-line).

TABLE 2

Aspheric Coefficients

| | | | Surface # | | | |
|---|---|---|---|---|---|---|
| | 2 | 3 | 4 | 5 | 6 | 7 |
| k = | −3.6985E−01 | −7.0417E+01 | −6.4203E+00 | −8.8870E−01 | −9.0000E+01 | 1.8670E+00 |
| A4 = | 1.5518E−02 | −8.6924E−02 | −2.2418E−01 | −9.7982E−02 | −7.1819E−02 | −4.0208E−02 |
| A6 = | 9.4898E−03 | 1.5900E−01 | 3.5271E−01 | 1.5253E−01 | 1.5708E−01 | −3.3222E−02 |
| A8 = | −9.1838E−03 | −1.1460E−01 | −2.6918E−01 | −2.6000E−02 | −7.7448E−01 | 8.6355E−02 |
| A10 = | 1.0156E−02 | 1.8076E−02 | 7.3291E−02 | −6.6183E−02 | 2.0361E+00 | −1.4856E−01 |
| A12 = | −6.3988E−03 | 2.7660E−02 | 2.7574E−02 | 6.5310E−02 | −2.9338E+00 | 1.3931E−01 |
| A14 = | 5.0121E−03 | −2.0340E−02 | −1.9617E−02 | −1.1469E−02 | 2.1937E+00 | −6.8554E−02 |
| A16 = | | | | | −6.6227E−01 | 1.4863E−02 |

| | | | Surface # | | | |
|---|---|---|---|---|---|---|
| | 8 | 9 | 10 | 11 | 12 | 13 |
| k = | −1.6324E+01 | −8.1032E+00 | −6.6228E−01 | −1.5063E+00 | −2.1973E+00 | −6.9958E+00 |
| A4 = | −1.1116E−01 | −1.4624E−01 | −1.2502E−01 | 1.7392E−01 | −2.7350E−01 | −1.4318E−01 |
| A6 = | 9.4946E−02 | 1.3450E−01 | 1.8405E−02 | −9.8366E−02 | 1.7782E−01 | 7.5055E−02 |
| A8 = | −9.5316E−02 | −7.8816E−02 | −3.4235E−02 | 6.1879E−02 | −7.2056E−02 | −2.8229E−02 |
| A10 = | 6.5315E−02 | 2.9350E−02 | 2.6602E−02 | −2.1557E−02 | 1.7062E−02 | 7.0062E−03 |
| A12 = | −2.8197E−02 | −5.7691E−03 | −7.9202E−03 | 4.1566E−03 | −2.3123E−03 | −1.0588E−03 |
| A14 = | 5.2948E−03 | 4.6114E−04 | 1.0618E−03 | −4.0478E−04 | 1.6819E−04 | 8.6620E−05 |
| A16 = | −2.1561E−04 | | −5.4542E−05 | 1.5382E−05 | −5.0763E−06 | −2.9046E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
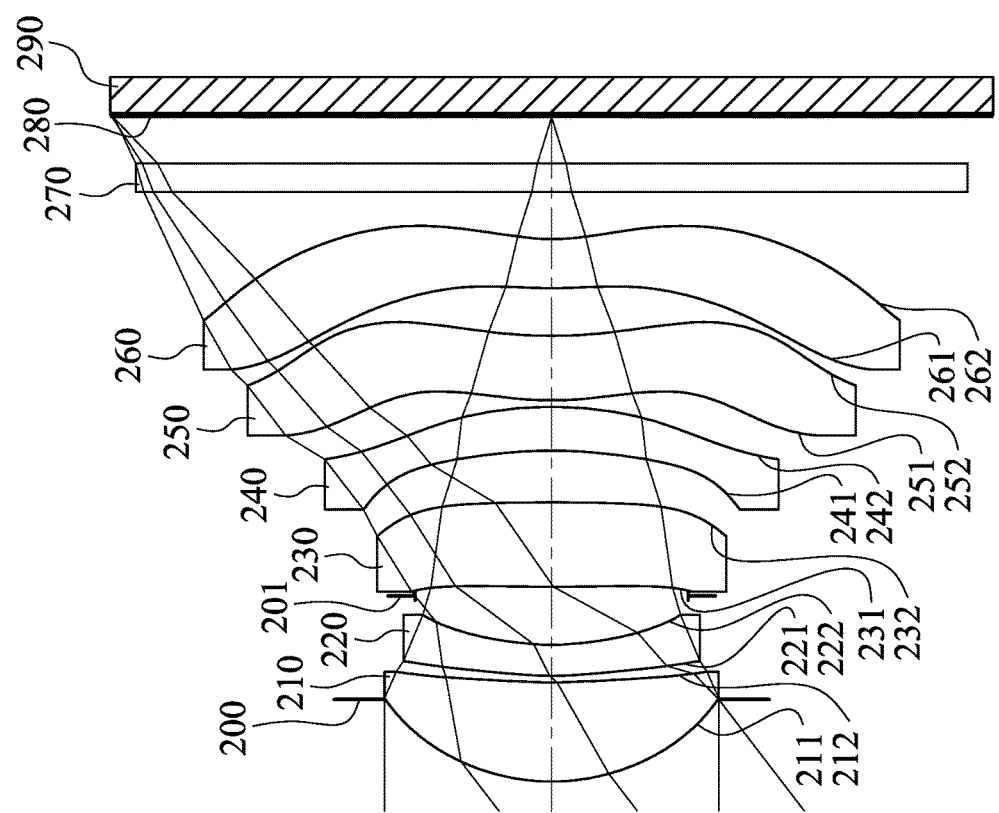
FIG. 3 is a schematic view of an image capturing apparatus according to the 2nd embodiment of the present disclosure.
Figure 4:
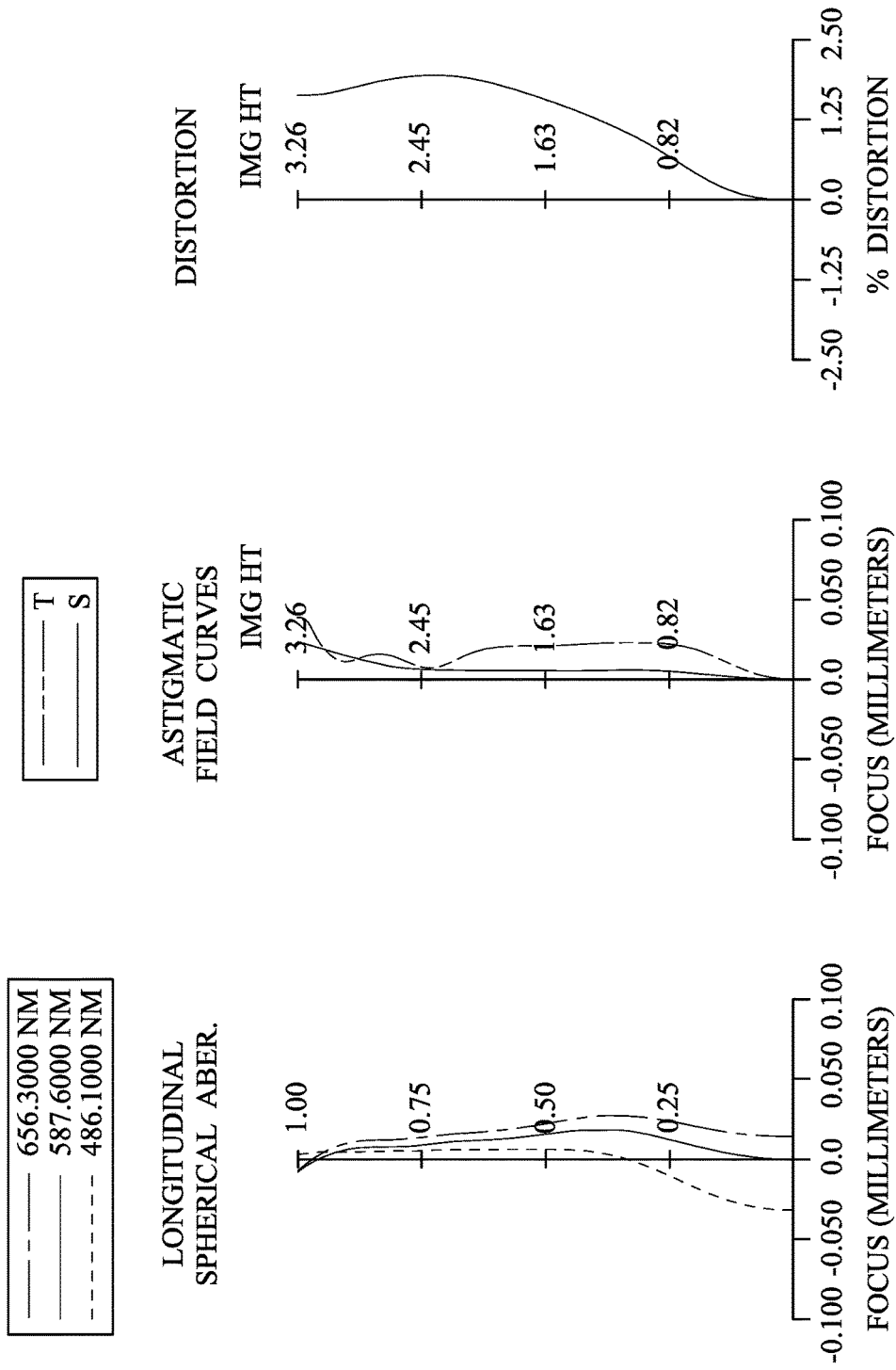
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes an image capturing lens assembly (its reference numeral is omitted) and an image sensor 290. The image capturing lens assembly includes, in order from an object side to an image side, an aperture stop 200, a first lens element 210, a second lens element 220, a stop 201, a third lens element 230, a fourth lens element 240, a fifth lens element 250, a sixth lens element 260, an IR-cut filter 270 and an image surface 280, wherein the image sensor 290 is disposed on the image surface 280 of the image capturing lens assembly. The image capturing lens assembly has a total of six lens elements (210-260).

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric. Furthermore, the object-side surface 231 of the third lens element 230 includes at least one inflection point.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the image-side surface 252 of the fifth lens element 250 includes at least two inflection points from the paraxial region thereof to an off-axial region thereof; in detail, according to the 2nd embodiment, the image-side surface 252 of the fifth lens element 250 includes three inflection points from the paraxial region thereof to the off-axial region thereof.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof, and the object-side surface 261 of the sixth lens element 260 includes at least one inflection point.

The IR-cut filter 270 is made of a glass material and located between the sixth lens element 260 and the image surface 280, and will not affect the focal length of the image capturing lens assembly.

The detailed optical data of the 2nd embodiment are shown in Table 3 and the aspheric surface data are shown in Table 4 below.

TABLE 3

2nd Embodiment
f = 4.18 mm, Fno = 1.69, HFOV = 37.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.608 | | | | |
| 2 | Lens 1 | 1.609 ASP | 0.734 | Plastic | 1.544 | 55.9 | 4.42 |
| 3 | | 4.091 ASP | 0.049 | | | | |
| 4 | Lens 2 | 2.622 ASP | 0.230 | Plastic | 1.660 | 20.4 | −19.41 |
| 5 | | 2.100 ASP | 0.361 | | | | |
| 6 | Stop | Plano | 0.068 | | | | |
| 7 | Lens 3 | 14.667 ASP | 0.625 | Plastic | 1.544 | 55.9 | 16.89 |
| 8 | | −24.180 ASP | 0.384 | | | | |
| 9 | Lens 4 | −3.287 ASP | 0.323 | Plastic | 1.639 | 23.5 | 97.28 |
| 10 | | −3.241 ASP | 0.050 | | | | |
| 11 | Lens 5 | 2.604 ASP | 0.478 | Plastic | 1.544 | 55.9 | 12.59 |
| 12 | | 3.930 ASP | 0.352 | | | | |
| 13 | Lens 6 | 4.062 ASP | 0.363 | Plastic | 1.639 | 23.5 | −4.50 |
| 14 | | 1.624 ASP | 0.350 | | | | |
| 15 | IR-cut filter | Plano | 0.210 | Glass | 1.517 | 64.2 | — |
| 16 | | Plano | 0.360 | | | | |
| 17 | Image | Plano | — | | | | |

Reference wavelength is 587.6 nm (d-line).
Effective radius of surface 6 is 1.010 mm.

TABLE 4

Aspheric Coefficients

| | Surface # | | | | | |
|---|---|---|---|---|---|---|
| | 2 | 3 | 4 | 5 | 7 | 8 |
| k = | −3.2548E−01 | −8.5733E+01 | −1.0494E+01 | −9.1061E−01 | 6.8664E+01 | −2.9462E+01 |
| A4 = | 8.7418E−03 | −1.1118E−01 | −2.5572E−01 | −9.9412E−02 | −5.5929E−02 | −2.1595E−02 |
| A6 = | 2.2909E−02 | 1.9563E−01 | 4.2286E−01 | 1.4248E−01 | 5.7066E−02 | −3.9179E−02 |
| A8 = | −3.6775E−02 | −1.1493E−01 | −3.3258E−01 | −1.4425E−01 | −2.6286E−01 | 2.8495E−02 |
| A10 = | 4.7047E−02 | −2.0338E−02 | 1.0732E−01 | −4.5815E−02 | 5.9726E−01 | −4.5703E−02 |
| A12 = | −2.8494E−02 | 5.9187E−02 | 2.0958E−02 | 2.1100E−02 | −7.9152E−01 | 3.3130E−02 |
| A14 = | 7.8109E−03 | −2.0878E−02 | −1.8952E−02 | 1.0007E−02 | 5.5153E−01 | −1.4274E−02 |
| A16 = | | | | | −1.5890E−01 | 3.2197E−03 |

TABLE 4-continued

Aspheric Coefficients

| | Surface # | | | | | |
|---|---|---|---|---|---|---|
| | 9 | 10 | 11 | 12 | 13 | 14 |
| k = | −1.3010E+01 | −1.6357E+01 | −1.6471E+00 | −6.2649E−01 | −7.5199E+01 | −1.2574E+01 |
| A4 = | 3.1887E−02 | −1.2585E−01 | −1.3597E−01 | 2.7189E−02 | −2.4190E−01 | −1.3940E−01 |
| A6 = | −5.9307E−02 | 7.7446E−02 | −4.3255E−03 | −1.1121E−01 | 1.7447E−01 | 7.4888E−02 |
| A8 = | 2.0039E−02 | −2.5652E−02 | −1.8173E−03 | 7.3519E−02 | −7.5364E−02 | −2.9357E−02 |
| A10 = | 2.9053E−03 | 9.1326E−03 | 1.1002E−02 | −2.7728E−02 | 1.9181E−02 | 7.5665E−03 |
| A12 = | −9.2314E−03 | −2.4361E−03 | −4.2289E−03 | 5.9138E−03 | −2.7734E−03 | −1.1810E−03 |
| A14 = | −1.1430E−04 | 2.5444E−04 | 6.1802E−04 | −6.4314E−04 | 2.1183E−04 | 9.9086E−05 |
| A16 = | 1.1347E−03 | | −3.2430E−05 | 2.7497E−05 | −6.6741E−06 | −3.3825E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.18 | T34/T23 | 0.90 |
| Fno | 1.69 | ΣCT/ΣAT | 2.18 |
| HFOV [deg.] | 37.5 | CTmax/CTmin | 3.19 |
| N6 | 1.639 | TL/ImgH | 1.51 |
| N6x HFOV | 61.40 | (R11 + R12)/(R11 − R12) | 2.33 |
| V6/N6 | 14.34 | R9/R5 | 0.18 |
| V1/V6 | 2.38 | Σ|Pi| | 0.84 |
| V6x (f/EPD) | 39.70 | Sag62/CT6 | −1.66 |
| (V2 + V4)/2 | 21.95 | |Sag52/Sag41| | 0.85 |
| CT5/CT2 | 2.08 | f/EPD | 1.69 |
| T23/CT4 | 1.33 | | |

Furthermore, in the image capturing lens assembly according to the 2nd embodiment, when a refractive power of the first lens element 210 is P1, the refractive power of the second lens element 220 is P2, the refractive power of the third lens element 230 is P3, the refractive power of the fourth lens element 240 is P4, the refractive power of the fifth lens element 250 is P5, and a refractive power of the sixth lens element 260 is P6, the following condition is satisfied: |Pi|<|P1| and |Pi|<|P6|, wherein i=2, 3, 4, 5.

In the image capturing lens assembly according to the 2nd embodiment, when the central thickness of the first lens element 210 is CT1, the central thickness of the second lens element 220 is CT2, the central thickness of the third lens element 230 is CT3, the central thickness of the fourth lens element 240 is CT4, the central thickness of the fifth lens element 250 is CT5, and the central thickness of the sixth lens element 260 is CT6, the following condition is satisfied: CT2<CT1; CT3<CT1; CT4<CT1; CT5<CT1; and CT6<CT1.

3rd Embodiment

Figure 5:
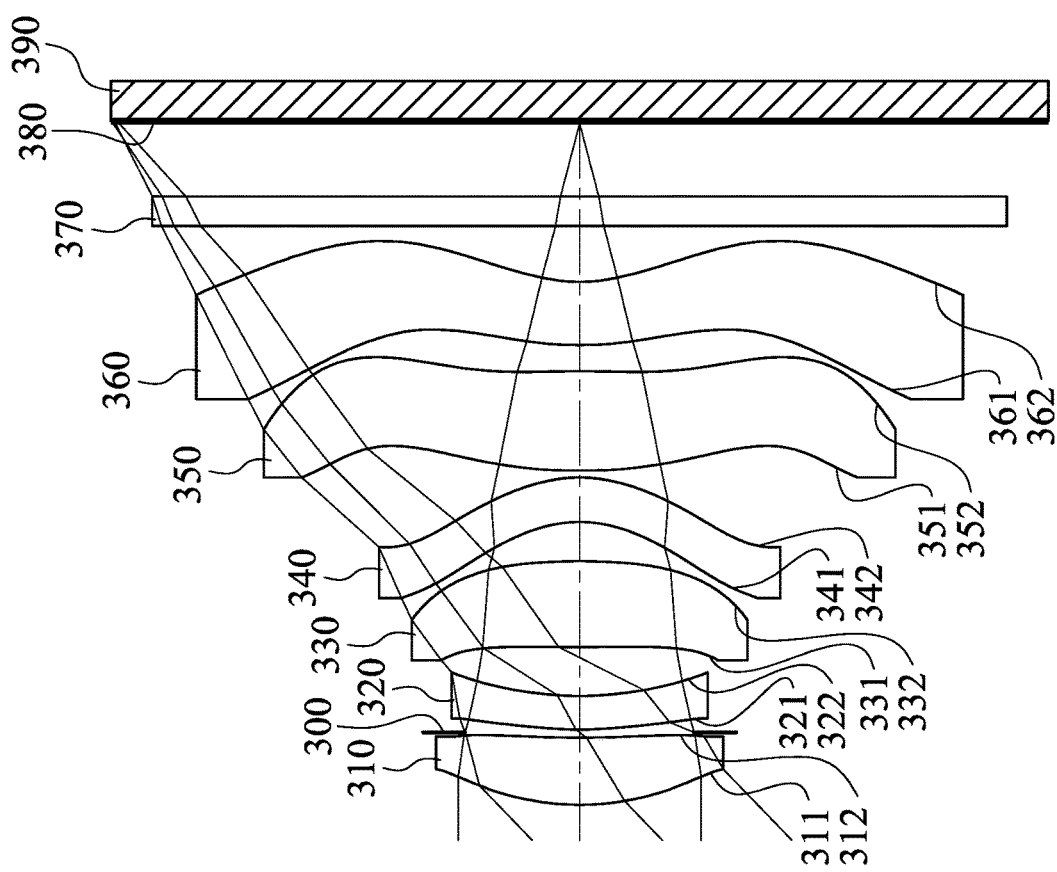
FIG. 5 is a schematic view of an image capturing apparatus according to the 3rd embodiment of the present disclosure.
Figure 6:
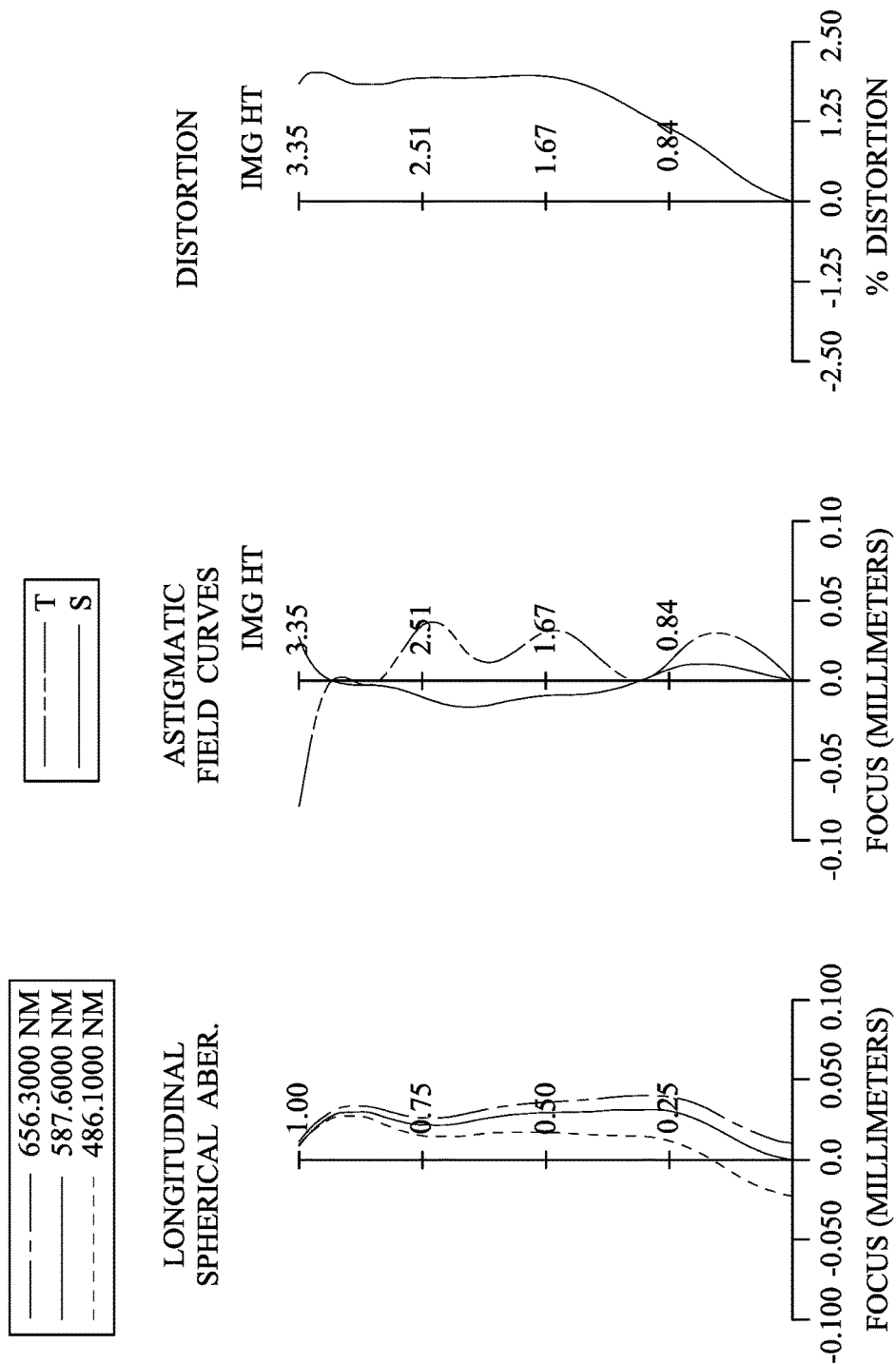
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes an image capturing lens assembly (its reference numeral is omitted) and an image sensor 390. The image capturing lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the image capturing lens assembly. The image capturing lens assembly has a total of six lens elements (310-360).

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric. Furthermore, the object-side surface 331 of the third lens element 330 includes at least one inflection point.

The fourth lens element 340 with negative refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric. Furthermore, the image-side surface 352 of the fifth lens element 350 includes at least two inflection points from the paraxial region thereof to an off-axial region thereof; in detail, according to the 3rd embodiment, the image-side surface 352 of the fifth lens element 350 includes two inflection points from the paraxial region thereof to the off-axial region thereof.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof, and the object-side surface 361 of the sixth lens element 360 includes at least one inflection point.

The IR-cut filter 370 is made of a glass material and located between the sixth lens element 360 and the image surface 380, and will not affect the focal length of the image capturing lens assembly.

The detailed optical data of the 3rd embodiment are shown in Table 5 and the aspheric surface data are shown in Table 6 below.

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.39 | T34/T23 | 0.80 |
| Fno | 1.96 | ΣCT/ΣAT | 3.04 |
| HFOV [deg.] | 44.0 | CTmax/CTmin | 2.96 |
| N6 | 1.650 | TL/ImgH | 1.46 |

TABLE 5

3rd Embodiment
f = 3.39 mm, Fno = 1.95, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.904 | ASP | 0.480 | Plastic | 1.544 | 55.9 | 5.10 |
| 2 | | 5.537 | ASP | 0.038 | | | | |
| 3 | Ape. Stop | Plano | | 0.021 | | | | |
| 4 | Lens 2 | 2.824 | ASP | 0.240 | Plastic | 1.660 | 20.4 | −26.19 |
| 5 | | 2.345 | ASP | 0.350 | | | | |
| 6 | Lens 3 | 18.822 | ASP | 0.616 | Plastic | 1.544 | 55.9 | 6.73 |
| 7 | | −4.491 | ASP | 0.281 | | | | |
| 8 | Lens 4 | −0.906 | ASP | 0.318 | Plastic | 1.639 | 23.3 | −73.52 |
| 9 | | −1.050 | ASP | 0.050 | | | | |
| 10 | Lens 5 | 4.586 | ASP | 0.711 | Plastic | 1.544 | 55.9 | 5.42 |
| 11 | | −7.788 | ASP | 0.187 | | | | |
| 12 | Lens 6 | 2.510 | ASP | 0.453 | Plastic | 1.650 | 21.5 | −4.19 |
| 13 | | 1.213 | ASP | 0.400 | | | | |
| 14 | IR-cut filter | Plano | | 0.210 | Glass | 1.517 | 64.2 | — |
| 15 | | Plano | | 0.540 | | | | |
| 16 | Image | Plano | | — | | | | |

Reference wavelength is 587.6 nm (d-line).

TABLE 6

Aspheric Coefficients

| | Surface # | | | | | |
|---|---|---|---|---|---|---|
| | 1 | 2 | 4 | 5 | 6 | 7 |
| k = | −5.9405E−01 | −8.2696E+01 | −9.0000E+01 | −6.0742E+00 | 9.0000E+01 | −7.6827E+00 |
| A4 = | −8.7840E−03 | −1.5943E−01 | 1.7719E−01 | −4.5544E−02 | −7.9848E−02 | −8.8381E−02 |
| A6 = | 8.7618E−02 | 5.2229E−01 | −9.3398E−01 | 1.1266E−01 | −5.7484E−02 | −6.5143E−03 |
| A8 = | −2.2083E−01 | −1.2915E+00 | 3.0303E+00 | 8.6112E−02 | 1.3952E−01 | −6.6283E−02 |
| A10 = | 2.5856E−01 | 1.9777E+00 | −5.5185E+00 | −4.0700E−01 | −2.3730E−01 | 7.2578E−02 |
| A12 = | −1.4894E−01 | −1.7850E+00 | 5.1752E+00 | 4.4870E−01 | 1.0687E−01 | −2.8827E−02 |
| A14 = | 1.2389E−02 | 6.6414E−01 | −1.9611E+00 | −1.6808E−01 | | 1.5074E−03 |

| | Surface # | | | | | |
|---|---|---|---|---|---|---|
| | 8 | 9 | 10 | 11 | 12 | 13 |
| k = | −2.4797E+00 | −2.4082E+00 | −1.1964E+01 | −1.4435E+00 | −5.5383E+00 | −4.2260E+00 |
| A4 = | −6.2331E−02 | 4.6551E−02 | 1.3046E−01 | 2.2370E−01 | −2.4168E−02 | −6.1336E−02 |
| A6 = | 7.8718E−02 | −1.4347E−01 | −1.6585E−01 | −1.5749E−01 | −6.9285E−02 | 6.1296E−04 |
| A8 = | −2.0561E−01 | 1.2639E−01 | 1.0494E−01 | 5.6524E−02 | 4.2372E−02 | 3.9786E−03 |
| A10 = | 3.4933E−01 | −1.7075E−02 | −4.4768E−02 | −1.2564E−02 | −1.1853E−02 | −1.1202E−03 |
| A12 = | −2.2659E−01 | −1.2671E−02 | 1.1189E−02 | 1.6312E−03 | 1.8191E−03 | 1.4963E−04 |
| A14 = | 5.8236E−02 | 4.2063E−03 | −1.4267E−03 | −1.1165E−04 | −1.4585E−04 | −9.9997E−06 |
| A16 = | −4.3847E−03 | −3.1221E−04 | 7.1401E−05 | 3.0810E−06 | 4.7010E−06 | 2.6132E−07 |

-continued

|  | 3rd Embodiment | | |
|---|---|---|---|
| N6x HFOV | 72.58 | (R11 + R12)/(R11 − R12) | 2.87 |
| V6/N6 | 13.01 | R9/R5 | 0.24 |
| V1/V6 | 2.60 | Σ\|Pi\| | 1.31 |
| V6x (f/EPD) | 41.87 | Sag62/CT6 | −0.21 |
| (V2 + V4)/2 | 21.85 | \|Sag52/Sag41\| | 0.76 |
| CT5/CT2 | 2.96 | f/EPD | 1.95 |
| T23/CT4 | 1.10 | | |

Furthermore, in the image capturing lens assembly according to the 3rd embodiment, when a refractive power of the first lens element 310 is P1, the refractive power of the second lens element 320 is P2, the refractive power of the third lens element 330 is P3, the refractive power of the fourth lens element 340 is P4, the refractive power of the fifth lens element 350 is P5, and a refractive power of the sixth lens element 360 is P6, the following condition is satisfied: |Pi|<|P1| and |Pi|<|P6|, wherein 1=2, 3, 4, 5.

4th Embodiment

Figure 7:
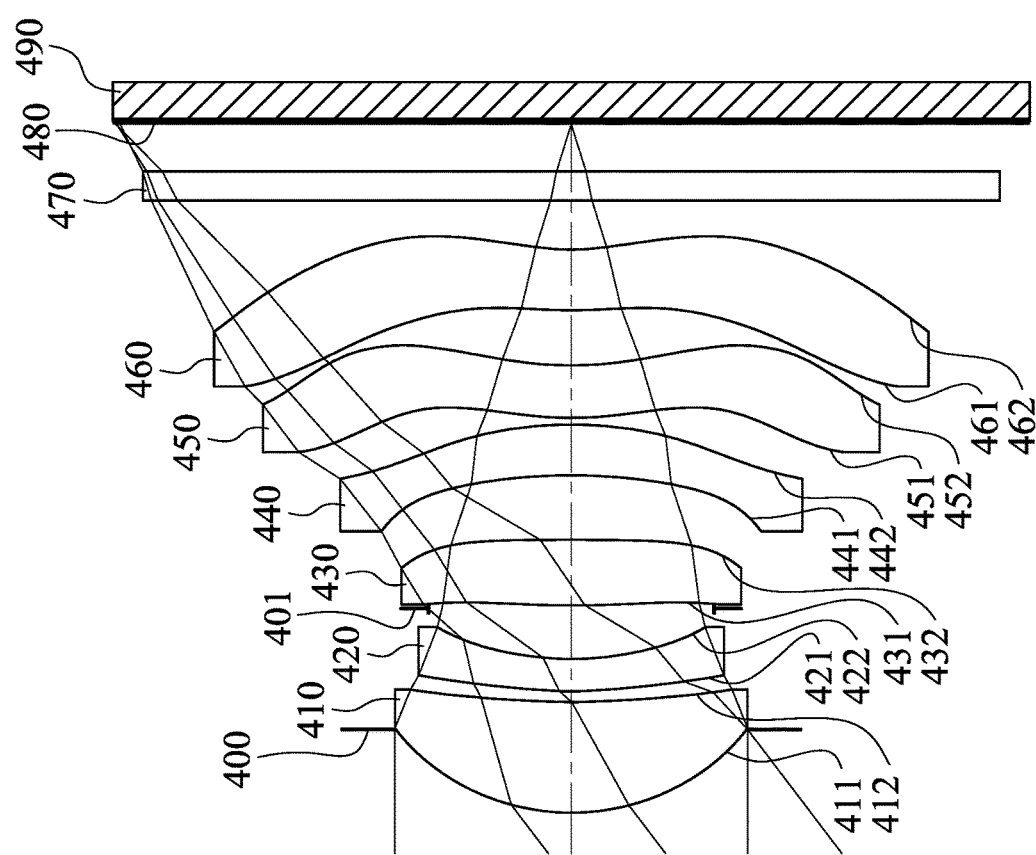
FIG. 7 is a schematic view of an image capturing apparatus according to the 4th embodiment of the present disclosure.
Figure 8:
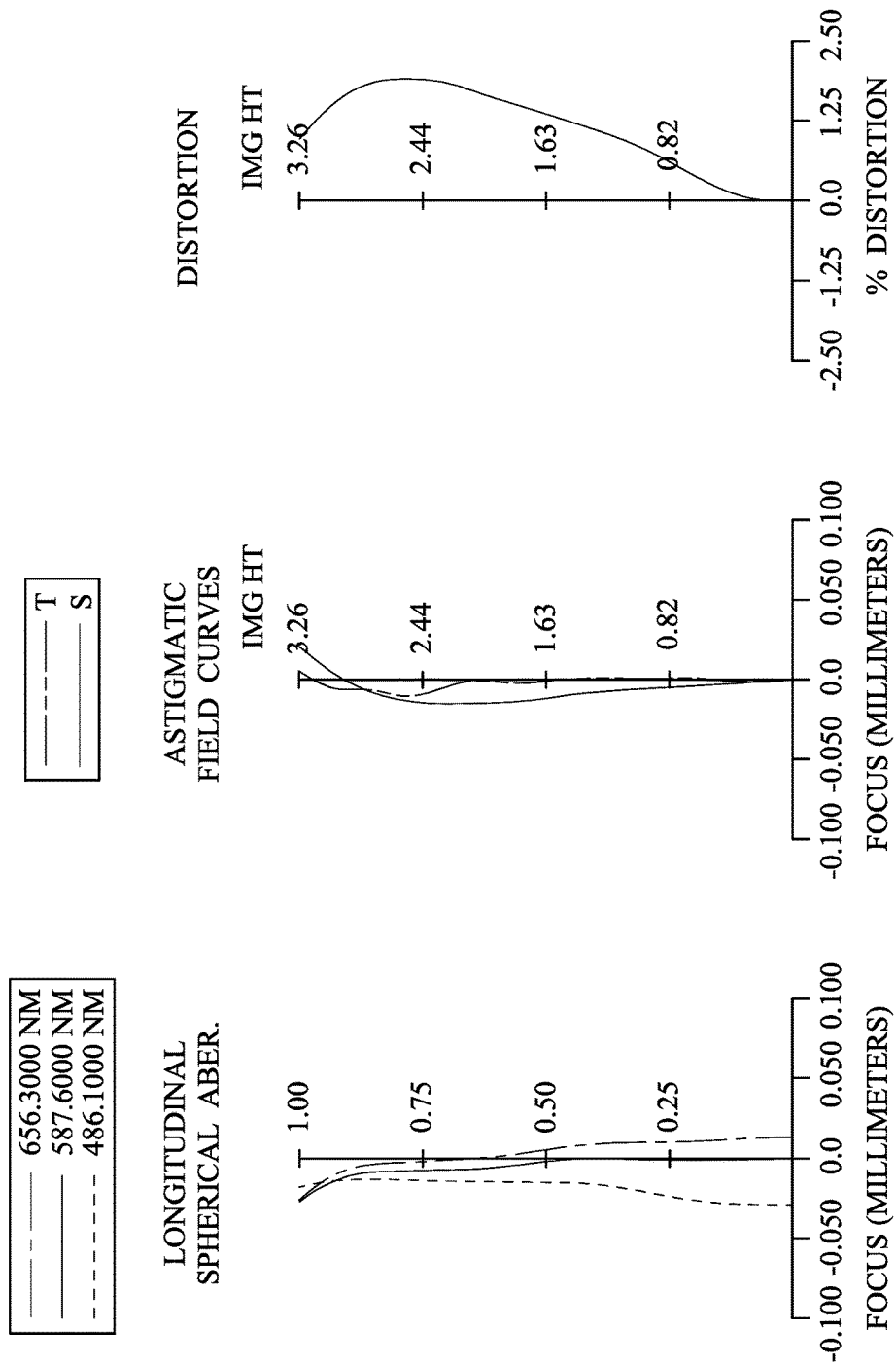
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes an image capturing lens assembly (its reference numeral is omitted) and an image sensor 490. The image capturing lens assembly includes, in order from an object side to an image side, an aperture stop 400, a first lens element 410, a second lens element 420, a stop 401, a third lens element 430, a fourth lens element 440, a fifth lens element 450, a sixth lens element 460, an IR-cut filter 470 and an image surface 480, wherein the image sensor 490 is disposed on the image surface 480 of the image capturing lens assembly. The image capturing lens assembly has a total of six lens elements (410-460).

The first lens element 410 with positive refractive power has an object-side surface 411 being convex in a paraxial region thereof and an Image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric. Furthermore, the object-side surface 431 of the third lens element 430 includes at least one inflection point.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least two inflection points from the paraxial region thereof to an off-axial region thereof; In detail, according to the 4th embodiment, the image-side surface 452 of the fifth lens element 450 includes two inflection points from the paraxial region thereof to the off-axial region thereof.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof, and the object-side surface 461 of the sixth lens element 460 includes at least one inflection point.

The IR-cut filter 470 is made of a glass material and located between the sixth lens element 460 and the image surface 480, and will not affect the focal length of the image capturing lens assembly.

The detailed optical data of the 4th embodiment are shown in Table 7 and the aspheric surface data are shown in Table 8 below.

TABLE 7

4th Embodiment
f = 4.26 mm, Fno = 1.69, HFOV = 37.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.595 | | | | |
| 2 | Lens 1 | 1.646 ASP | 0.791 | Plastic | 1.544 | 55.9 | 4.39 |
| 3 | | 4.408 ASP | 0.077 | | | | |
| 4 | Lens 2 | 2.726 ASP | 0.230 | Plastic | 1.660 | 20.4 | −13.01 |
| 5 | | 1.999 ASP | 0.361 | | | | |
| 6 | Stop | Plano | 0.024 | | | | |
| 7 | Lens 3 | 7.833 ASP | 0.469 | Plastic | 1.544 | 55.9 | 11.87 |
| 8 | | −35.879 ASP | 0.461 | | | | |

TABLE 7-continued

4th Embodiment
f = 4.26 mm, Fno = 1.69, HFOV = 37.2 deg.

| Surface # | | Curvature Radius | Thickness | Material | Index | Abbe # | Focal Length |
|---|---|---|---|---|---|---|---|
| 9 | Lens 4 | −3.882 ASP | 0.361 | Plastic | 1.639 | 23.6 | 28.05 |
| 10 | | −3.306 ASP | 0.050 | | | | |
| 11 | Lens 5 | 2.603 ASP | 0.375 | Plastic | 1.544 | 65.9 | 57.95 |
| 12 | | 2.693 ASP | 0.394 | | | | |
| 13 | Lens 6 | 3.739 ASP | 0.433 | Plastic | 1.639 | 23.5 | −5.47 |
| 14 | | 1.725 ASP | 0.350 | | | | |
| 15 | IR-cut filter | Plano | 0.210 | Glass | 1.517 | 64.2 | — |
| 16 | | Plano | 0.358 | | | | |
| 17 | Image | Plano | — | | | | |

Reference wavelength is 587.6 nm (d-line).
Effective radius of surface 6 is 1.020 mm.

TABLE 8

Aspheric Coefficients

| | Surface # | | | | | |
|---|---|---|---|---|---|---|
| | 2 | 3 | 4 | 5 | 7 | 8 |
| k = | −4.5300E−01 | −8.2313E+01 | −7.2239E+00 | −1.1349E+00 | 3.7236E+01 | 6.8433E+01 |
| A4 = | 1.2065E−02 | −5.1351E−02 | −2.1893E−01 | −1.1369E−01 | −5.0142E−02 | −3.2837E−02 |
| A6 = | 9.1290E−03 | 8.0844E−02 | 3.0372E−01 | 1.6132E−01 | −4.0854E−02 | −4.9693E−02 |
| A8 = | −6.5641E−03 | −1.7731E−02 | −1.7596E−01 | −9.6441E−03 | 1.5758E−01 | 1.0478E−01 |
| A10 = | 8.3551E−03 | −4.3349E−02 | 7.2076E−03 | −8.3398E−02 | −3.9681E−01 | −2.1323E−01 |
| A12 = | −4.0545E−03 | 4.3515E−02 | 4.7825E−02 | 6.8072E−02 | 5.1644E−01 | 2.1379E−01 |
| A14 = | 1.2528E−03 | −1.3391E−02 | −2.0184E−02 | −1.1031E−02 | −3.4881E−01 | −1.1271E−01 |
| A16 = | | | | | 9.5941E−02 | 2.4587E−02 |

| | Surface # | | | | | |
|---|---|---|---|---|---|---|
| | 9 | 10 | 11 | 12 | 13 | 14 |
| k = | −4.7197E+01 | −9.3830E+00 | −1.4024E+00 | −2.0774E+00 | −3.7812E+01 | −1.1303E+01 |
| A4 = | −7.2612E−02 | −1.0972E−01 | −1.1754E−01 | −1.4646E−02 | −2.4874E−01 | −1.4157E−01 |
| A6 = | 6.1345E−02 | 7.4429E−02 | −1.1538E−02 | −6.9087E−02 | 1.7077E−01 | 7.2986E−02 |
| A8 = | −6.3448E−02 | −2.9621E−02 | 1.5926E−03 | 4.7780E−02 | −7.0162E−02 | −2.8555E−02 |
| A10 = | 3.2418E−02 | 1.1844E−02 | 7.9934E−03 | −1.7444E−02 | 1.7402E−02 | 7.4078E−03 |
| A12 = | −1.0193E−02 | −3.1287E−03 | −3.1567E−03 | 3.4958E−03 | −2.5059E−03 | −1.1518E−03 |
| A14 = | −2.0131E−03 | 3.1730E−04 | 4.6339E−04 | −3.5083E−04 | 1.9355E−04 | 9.5666E−05 |
| A16 = | 1.3532E−03 | | −2.4647E−05 | 1.3677E−05 | −6.2246E−06 | −3.2325E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.26 | T34/T23 | 1.20 |
| Fno | 1.69 | ΣCT/ΣAT | 1.95 |
| HFOV [deg.] | 37.2 | CTmax/CTmin | 3.44 |
| N6 | 1.639 | TL/ImgH | 1.52 |
| N6x HFOV | 60.99 | (R11 + R12)/(R11 − R12) | 2.71 |
| V6/N6 | 14.34 | R9/R5 | 0.33 |
| V1/V6 | 2.38 | Σ|Pi| | 0.91 |
| V6x (f/EPD) | 39.70 | Sag62/CT6 | −1.36 |
| (V2 + V4)/2 | 21.95 | |Sag52/Sag41| | 0.70 |

-continued

| 4th Embodiment | | | |
|---|---|---|---|
| CT5/CT2 | 1.63 | f/EPD | 1.69 |
| T23/CT4 | 1.07 | | |

Furthermore, in the image capturing lens assembly according to the 4th embodiment, when a refractive power of the first lens element 410 is P1, the refractive power of the second lens element 420 is P2, the refractive power of the third lens element 430 is P3, the refractive power of the fourth lens element 440 is P4, the refractive power of the fifth lens element 450 is P5, and a refractive power of the sixth lens element 460 is P6, the following condition is satisfied: |Pi|<|P1| and |Pi|<|P6|, wherein i=2, 3, 4, 5.

In the image capturing lens assembly according to the 4th embodiment, when the central thickness of the first lens element 410 is CT1, the central thickness of the second lens element 420 is CT2, the central thickness of the third lens element 430 is CT3, the central thickness of the fourth lens element 440 is CT4, the central thickness of the fifth lens element 450 is CT5, and the central thickness of the sixth lens element 460 is CT6, the following condition is satisfied: CT2<CT1; CT3<CT1; CT4<CT1; CT5<CT1; and CT6<CT1.

5th Embodiment

Figure 9:
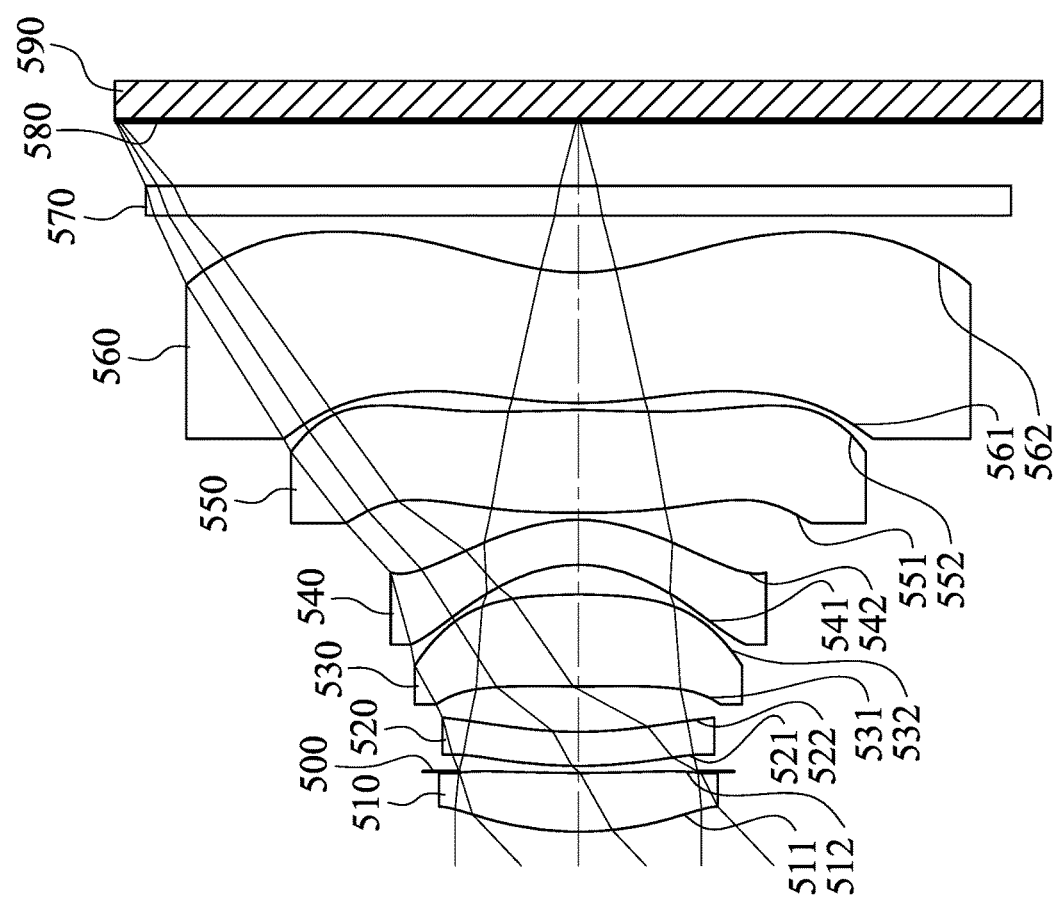
FIG. 9 is a schematic view of an image capturing apparatus according to the 5th embodiment of the present disclosure.
Figure 10:
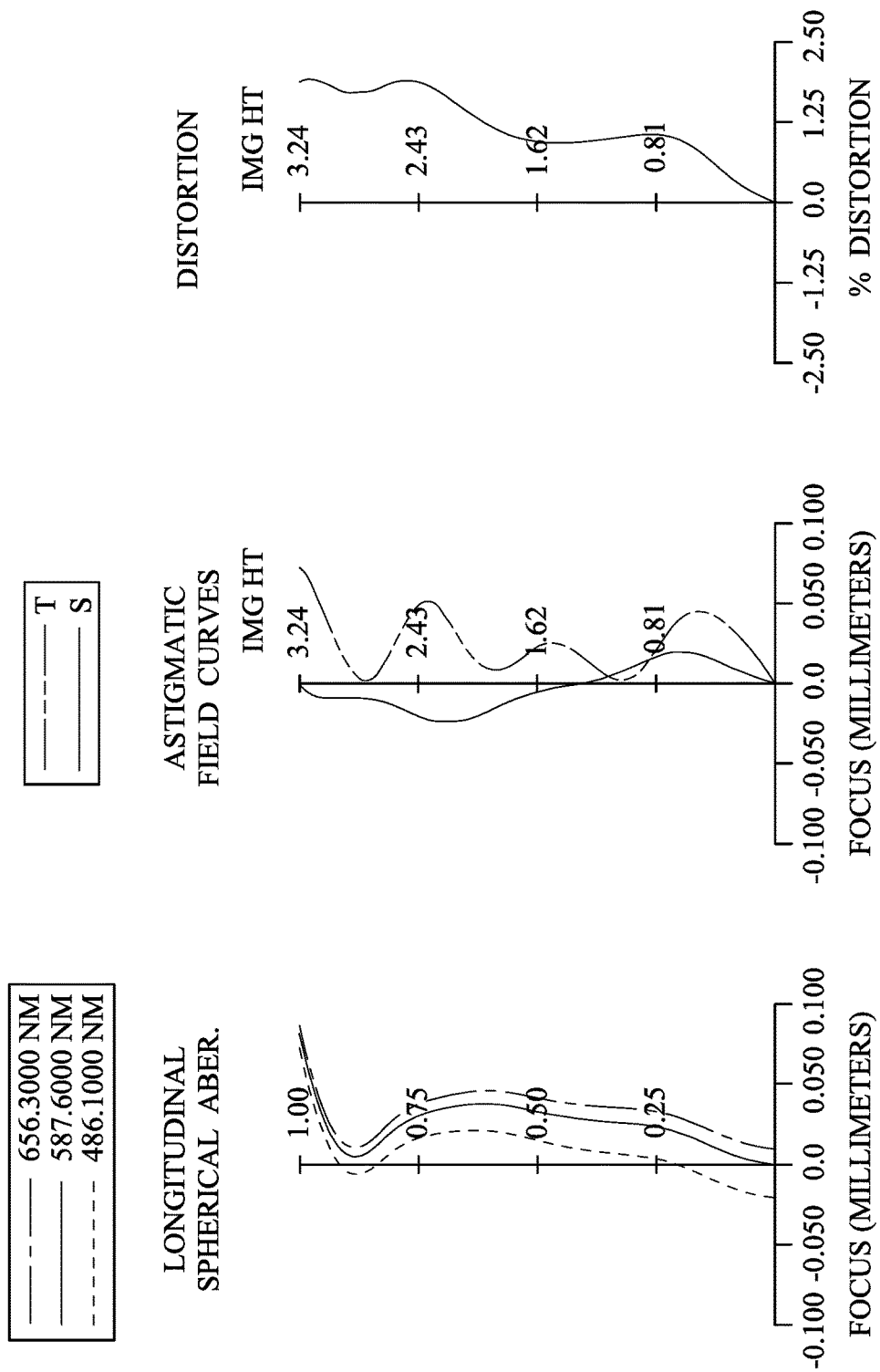
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes an image capturing lens assembly (its reference numeral is omitted) and an image sensor 590. The image capturing lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the image sensor 590 is disposed on the image surface 580 of the image capturing lens assembly. The image capturing lens assembly has a total of six lens elements (510-560).

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric. Furthermore, the object-side surface 531 of the third lens element 530 includes at least one inflection point.

The fourth lens element 540 with negative refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric. Furthermore, the image-side surface 552 of the fifth lens element 550 includes at least two inflection points from the paraxial region thereof to an off-axial region thereof; in detail, according to the 5th embodiment, the image-side surface 552 of the fifth lens element 550 includes two inflection points from the paraxial region thereof to the off-axial region thereof.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof, and the object-side surface 561 of the sixth lens element 560 includes at least one inflection point.

The IR-cut filter 570 is made of a glass material and located between the sixth lens element 560 and the image surface 580, and will not affect the focal length of the image capturing lens assembly.

The detailed optical data of the 5th embodiment are shown in Table 9 and the aspheric surface data are shown in Table 10 below.

TABLE 9

5th Embodiment
f = 3.32 mm, Fno = 1.92, HFOV = 43.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.225 | ASP | 0.413 | Plastic | 1.544 | 55.9 | 5.38 |
| 2 | | 8.679 | ASP | 0.011 | | | | |
| 3 | Ape. Stop | Plano | | 0.039 | | | | |
| 4 | Lens 2 | 2.994 | ASP | 0.240 | Plastic | 1.544 | 55.9 | 132.93 |
| 5 | | 3.035 | ASP | 0.319 | | | | |
| 6 | Lens 3 | 22.218 | ASP | 0.645 | Plastic | 1.544 | 55.9 | 7.11 |
| 7 | | −4.628 | ASP | 0.209 | | | | |
| 8 | Lens 4 | −0.973 | ASP | 0.315 | Plastic | 1.639 | 23.3 | −19.40 |
| 9 | | −1.190 | ASP | 0.050 | | | | |
| 10 | Lens 5 | 11.883 | ASP | 0.722 | Plastic | 1.544 | 55.9 | 6.76 |
| 11 | | −5.205 | ASP | 0.050 | | | | |
| 12 | Lens 6 | 3.356 | ASP | 0.916 | Plastic | 1.671 | 19.5 | −5.22 |
| 13 | | 1.526 | ASP | 0.400 | | | | |
| 14 | IR-cut filter | Plano | | 0.210 | Glass | 1.517 | 64.2 | — |
| 15 | | Plano | | 0.456 | | | | |
| 16 | Image | Plano | | — | | | | |

Reference wavelength is 587.6 nm (d-line).

TABLE 10

Aspheric Coefficients

| Surface # | | | | | | |
|---|---|---|---|---|---|---|
| | 1 | 2 | 4 | 5 | 6 | 7 |
| k = | −1.6521E+00 | −8.2696E+01 | −9.0000E+01 | −6.0830E+00 | −9.0000E+01 | 1.0509E+01 |
| A4 = | −8.2197E−03 | −1.3762E−01 | 1.7273E−01 | −7.8304E−01 | −9.8960E−02 | −1.3790E−01 |
| A6 = | 8.4548E−02 | 6.2497E−01 | −3.9632E−01 | 1.9933E−01 | −6.0467E−02 | −2.5490E−02 |
| A8 = | −2.4841E−01 | −1.7470E+00 | 9.3582E−01 | −3.4717E−01 | 1.3624E−01 | −7.3255E−02 |
| A10 = | 3.4131E−01 | 2.5993E+00 | −1.8110E+00 | 2.4951E−01 | −2.3275E−01 | 7.3116E−02 |
| A12 = | −2.6130E−01 | −2.2792E+00 | 1.7057E+00 | −6.1876E−02 | 1.0687E−01 | −1.8483E−02 |
| A14 = | 4.9541E−02 | 8.5656E−01 | −6.3606E−01 | −6.3511E−03 | | 1.5074E−03 |

| Surface # | | | | | | |
|---|---|---|---|---|---|---|
| | 8 | 9 | 10 | 11 | 12 | 13 |
| k = | −2.0039E+00 | −3.0454E+00 | −1.1964E+01 | −1.4435E+00 | −4.1485E+00 | −4.8861E+00 |
| A4 = | −5.0852E−02 | 7.2905E−02 | 1.9257E−01 | 2.2879E−01 | −6.0647E−03 | −5.3817E−02 |
| A6 = | −2.7076E−01 | −4.0765E−01 | −3.0275E−01 | −1.9422E−01 | −1.1746E−01 | 6.0257E−03 |
| A8 = | 1.2037E+00 | 9.0090E−01 | 2.5511E−01 | 9.5086E−02 | 9.7398E−02 | 2.8193E−03 |
| A10 = | −2.1088E+00 | −9.2959E−01 | −1.4159E−01 | −2.9043E−02 | −3.7501E−02 | −1.2654E−03 |
| A12 = | 1.8514E+00 | 4.9934E−01 | 4.4385E−02 | 5.0162E−03 | 7.5179E−03 | 2.0597E−04 |
| A14 = | −7.8725E−01 | −1.3098E−01 | −6.9142E−03 | −4.4696E−04 | −7.5271E−04 | −1.5403E−05 |
| A16 = | 1.2968E−01 | 1.3107E−02 | 4.1233E−04 | 1.6010E−05 | 2.9479E−05 | 4.3663E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.32 | T34/T23 | 0.66 |
| Fno | 1.92 | ΣCT/ΣAT | 4.80 |
| HFOV [deg.] | 43.6 | CTmax/CTmin | 3.82 |
| N6 | 1.671 | TL/ImgH | 1.54 |
| N6x HFOV | 72.85 | (R11 + R12)/(R11 − R12) | 2.67 |
| V6/N6 | 11.66 | R9/R5 | 0.53 |
| V1/V6 | 2.87 | Σ|Pi| | 1.15 |
| V6x (f/EPD) | 37.40 | Sag62/CT6 | −0.09 |
| (V2 + V4)/2 | 39.60 | |Sag52/Sag41| | 0.53 |
| CT5/CT2 | 3.01 | f/EPD | 1.92 |
| T23/CT4 | 1.01 | | |

Furthermore, in the image capturing lens assembly according to the 5th embodiment, when a refractive power of the first lens element 510 is P1, the refractive power of the second lens element 520 is P2, the refractive power of the third lens element 530 is P3, the refractive power of the fourth lens element 540 is P4, the refractive power of the fifth lens element 550 is P5, and a refractive power of the sixth lens element 560 is P6, the following condition is satisfied: |Pi|<|P1| and |Pi|<|P6|, wherein i=2, 3, 4, 5.

6th Embodiment

Figure 11:
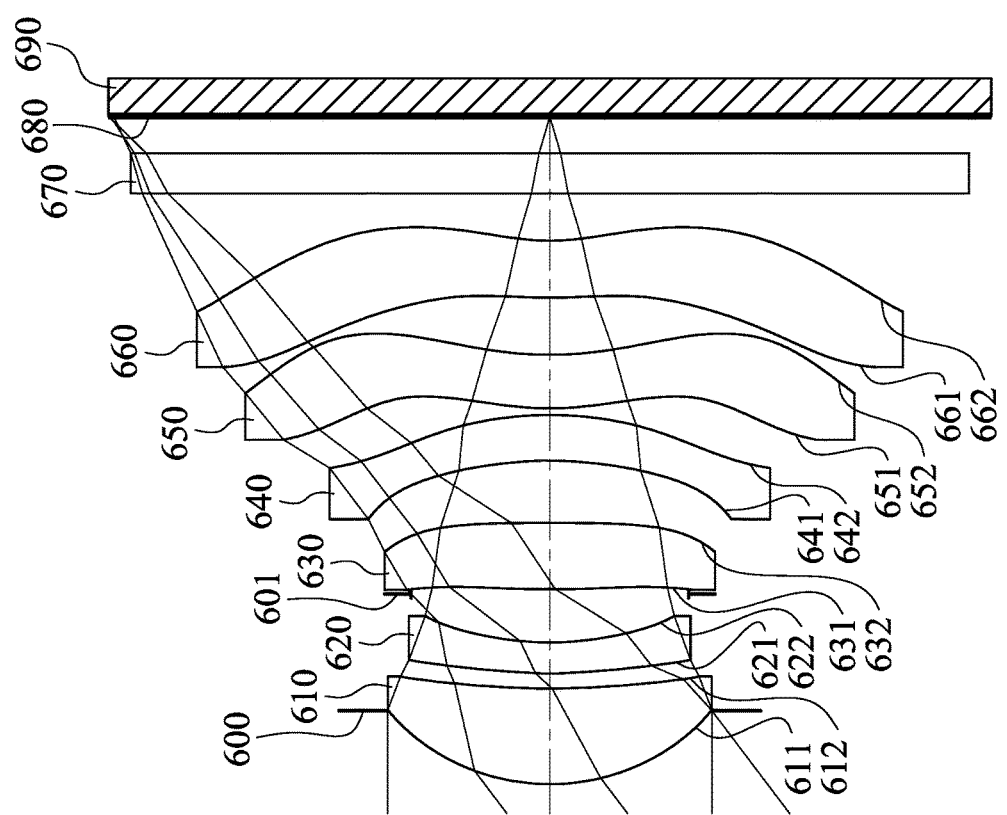
FIG. 11 is a schematic view of an image capturing apparatus according to the 6th embodiment of the present disclosure.
Figure 12:
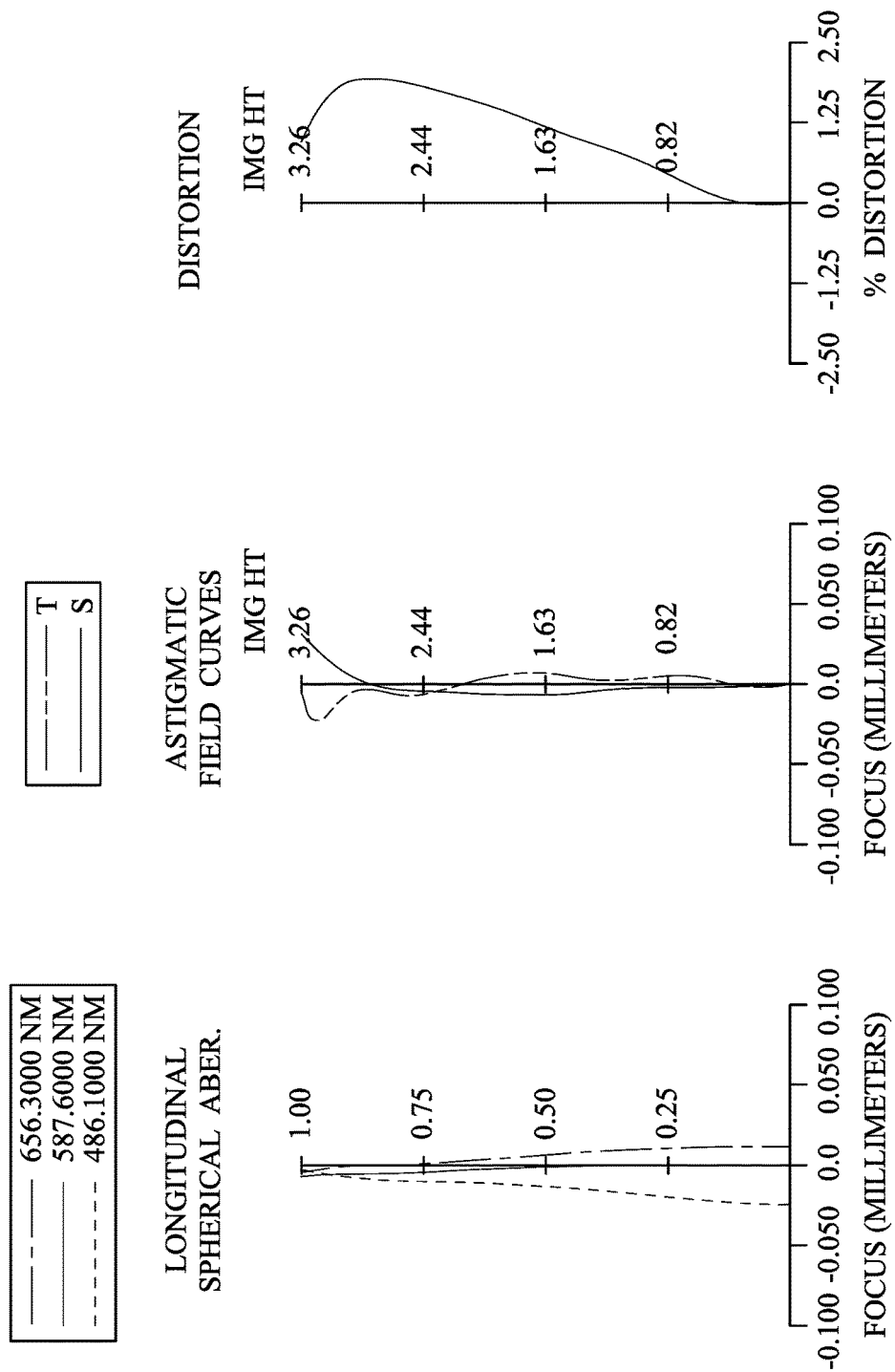
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes an image capturing lens assembly (its reference numeral is omitted) and an image sensor 690. The image capturing lens assembly includes, in order from an object side to an image side, an aperture stop 600, a first lens element 610, a second lens element 620, a stop 601, a third lens element 630, a fourth lens element 640, a fifth lens element 650, a sixth lens element 660, an IR-cut filter 670 and an image surface 680, wherein the image sensor 690 is disposed on the image surface 680 of the image capturing lens assembly. The image capturing lens assembly has a total of six lens elements (610-660).

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric. Furthermore, the object-side surface 631 of the third lens element 630 includes at least one inflection point.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least two inflection points from the paraxial region thereof to an off-axial region thereof; in detail, according to the 6th embodiment, the image-side surface 652 of the fifth lens element 650 includes three inflection points from the paraxial region thereof to the off-axial region thereof.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axial region thereof, and the object-side surface 661 of the sixth lens element 660 includes at least one inflection point.

The IR-cut filter 670 is made of a glass material and located between the sixth lens element 660 and the image surface 680, and will not affect the focal length of the image capturing lens assembly.

The detailed optical data of the 6th embodiment are shown in Table 11 and the aspheric surface data are shown in Table 12 below.

TABLE 11

6th Embodiment
f = 4.28 mm, Fno = 1.78, HFOV = 37.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.546 | | | | |
| 2 | Lens 1 | 1.621 ASP | 0.709 | Plastic | 1.544 | 55.9 | 4.23 |
| 3 | | 4.652 ASP | 0.113 | | | | |
| 4 | Lens 2 | 2.968 ASP | 0.230 | Plastic | 1.660 | 20.4 | −11.94 |
| 5 | | 2.089 ASP | 0.361 | | | | |
| 6 | Stop | Plano | 0.036 | | | | |
| 7 | Lens 3 | 8.313 ASP | 0.493 | Plastic | 1.544 | 55.9 | 11.08 |
| 8 | | −21.415 ASP | 0.461 | | | | |
| 9 | Lens 4 | −2.908 ASP | 0.340 | Plastic | 1.639 | 23.5 | 144.09 |
| 10 | | −2.947 ASP | 0.050 | | | | |
| 11 | Lens 5 | 2.437 ASP | 0.398 | Plastic | 1.544 | 55.9 | 23.03 |
| 12 | | 2.851 ASP | 0.423 | | | | |
| 13 | Lens 6 | 4.106 ASP | 0.424 | Plastic | 1.639 | 23.5 | −4.87 |
| 14 | | 1.698 ASP | 0.350 | | | | |
| 15 | IR-cut filter | Plano | 0.300 | Glass | 1.517 | 64.2 | — |
| 16 | | Plano | 0.275 | | | | |
| 17 | Image | Plano | — | | | | |

Reference wavelength is 587.6 nm (d-line).
Effective radius of surface 6 is 1.030 mm.

TABLE 12

Aspheric Coefficients

| Surface # | | | | | |
|---|---|---|---|---|---|
| 2 | 3 | 4 | 5 | 7 | 8 |
| k = −3.6124E−01 | −6.5887E+01 | −6.6478E+00 | −1.2720E+00 | 4.1282E+01 | −4.6334E+01 |
| A4 = 1.0415E−02 | −3.6971E−02 | −2.0269E−01 | −1.3090E−01 | −5.9029E−02 | −3.4331E−02 |
| A6 = 1.0483E−02 | 5.4835E−02 | 2.3745E−01 | 1.7656E−01 | −3.2194E−02 | −4.0673E−02 |
| A8 = −1.0622E−02 | −8.2197E−03 | −6.9209E−02 | 5.7095E−03 | 1.0599E−01 | 6.3012E−02 |
| A10 = 1.5147E−02 | −2.7709E−02 | −7.8103E−02 | −1.1273E−01 | −2.3527E−01 | −1.1605E−01 |
| A12 = −8.8152E−03 | 2.8013E−02 | 8.5224E−02 | 9.1921E−02 | 2.8080E−01 | 1.0799E−01 |
| A14 = 2.7202E−03 | −9.2374E−03 | −2.7867E−02 | −1.8150E−02 | −1.7860E−01 | −5.5383E−02 |
| A16 = | | | | 4.6968E−02 | 1.2131E−02 |

| Surface # | | | | | |
|---|---|---|---|---|---|
| 9 | 10 | 11 | 12 | 13 | 14 |
| k = −1.3755E+01 | −9.9200E+00 | −1.5655E+00 | −1.5818E+00 | −2.7652E+01 | −1.1030E+01 |
| A4 = −1.7802E−02 | −1.0941E−01 | −1.1819E−01 | −1.3738E−01 | −2.7314E−01 | −1.4328E−01 |
| A6 = −4.4655E−02 | 7.1493E−02 | 1.9677E−02 | −6.5913E−02 | 2.0519E−01 | 7.8311E−02 |
| A8 = 7.0619E−02 | −3.0897E−02 | −3.6497E−02 | 3.9679E−02 | −8.8477E−02 | −3.0141E−02 |
| A10 = −7.9213E−02 | 1.4569E−02 | 2.7575E−02 | −1.3070E−02 | 2.2471E−02 | 7.2384E−03 |
| A12 = 4.9856E−02 | −4.0860E−03 | −8.3252E−03 | 2.4164E−03 | −3.2909E−03 | −1.0194E−03 |
| A14 = −2.0049E−02 | 4.2036E−04 | 1.1500E−03 | −2.2826E−04 | 2.5828E−04 | 7.6972E−05 |
| A16 = 3.5334E−03 | | −6.0971E−05 | 8.4850E−06 | −8.4423E−06 | −2.3948E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.28 | T34/T23 | 1.16 |
| Fno | 1.78 | ΣCT/ΣAT | 1.80 |
| HFOV [deg.] | 37.1 | CTmax/CTmin | 3.08 |
| N6 | 1.639 | TL/ImgH | 1.52 |
| N6x HFOV | 60.72 | (R11 + R12)/(R11 − R12) | 2.41 |
| V6/N6 | 14.34 | R9/R5 | 0.29 |
| V1/V6 | 2.38 | Σ\|Pi\| | 0.96 |
| V6x (f/EPD) | 41.81 | Sag62/CT6 | −1.25 |
| (V2 + V4)/2 | 21.95 | \|Sag52/Sag41\| | 0.66 |
| CT5/CT2 | 1.73 | f/EPD | 1.78 |
| T23/CT4 | 1.17 | | |

Furthermore, in the image capturing lens assembly according to the 6th embodiment, when a refractive power of the first lens element 610 is P1, the refractive power of the second lens element 620 is P2, the refractive power of the third lens element 630 is P3, the refractive power of the fourth lens element 640 is P4, the refractive power of the fifth lens element 650 is P5, and a refractive power of the sixth lens element 660 is P6, the following condition is satisfied: |Pi|<|P1| and |Pi|<|P6|, wherein i=2, 3, 4, 5.

In the image capturing lens assembly according to the 6th embodiment, when the central thickness of the first lens element 610 is CT1, the central thickness of the second lens element 620 is CT2, the central thickness of the third lens element 630 is CT3, the central thickness of the fourth lens element 640 is CT4, the central thickness of the fifth lens element 650 is CT5, and the central thickness of the sixth lens element 660 is CT6, the following condition is satisfied: CT2<CT1; CT3<CT1; CT4<CT1; CT5<CT1; and CT6<CT1.

7th Embodiment

Figure 13:
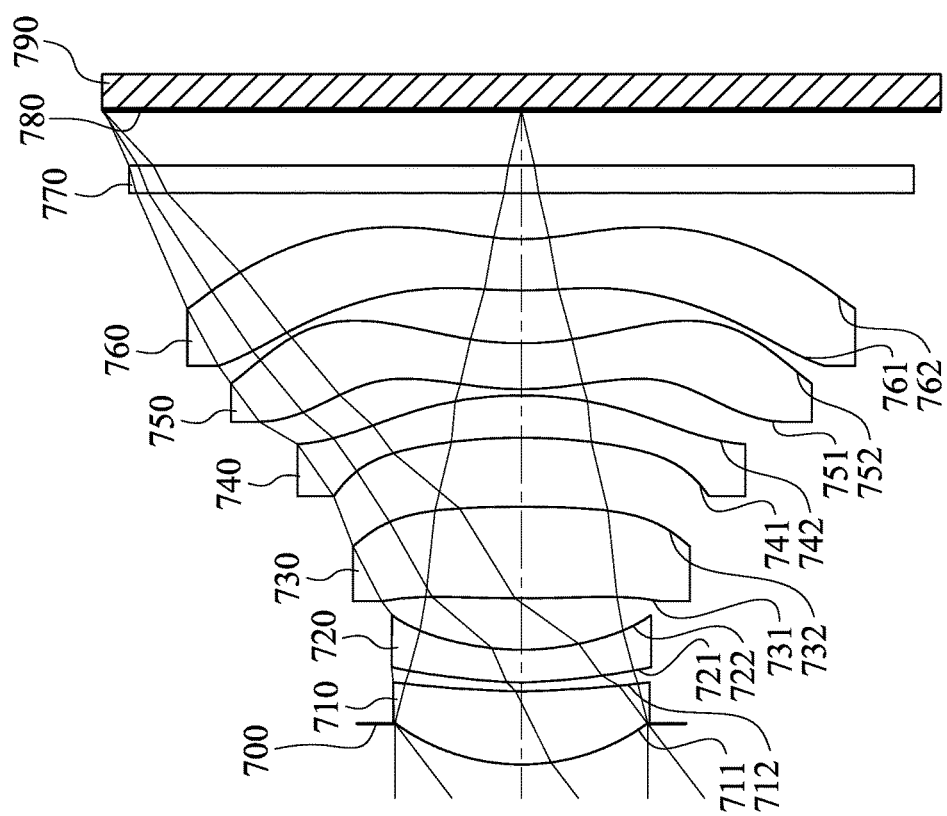
FIG. 13 is a schematic view of an image capturing apparatus according to the 7th embodiment of the present disclosure.
Figure 14:
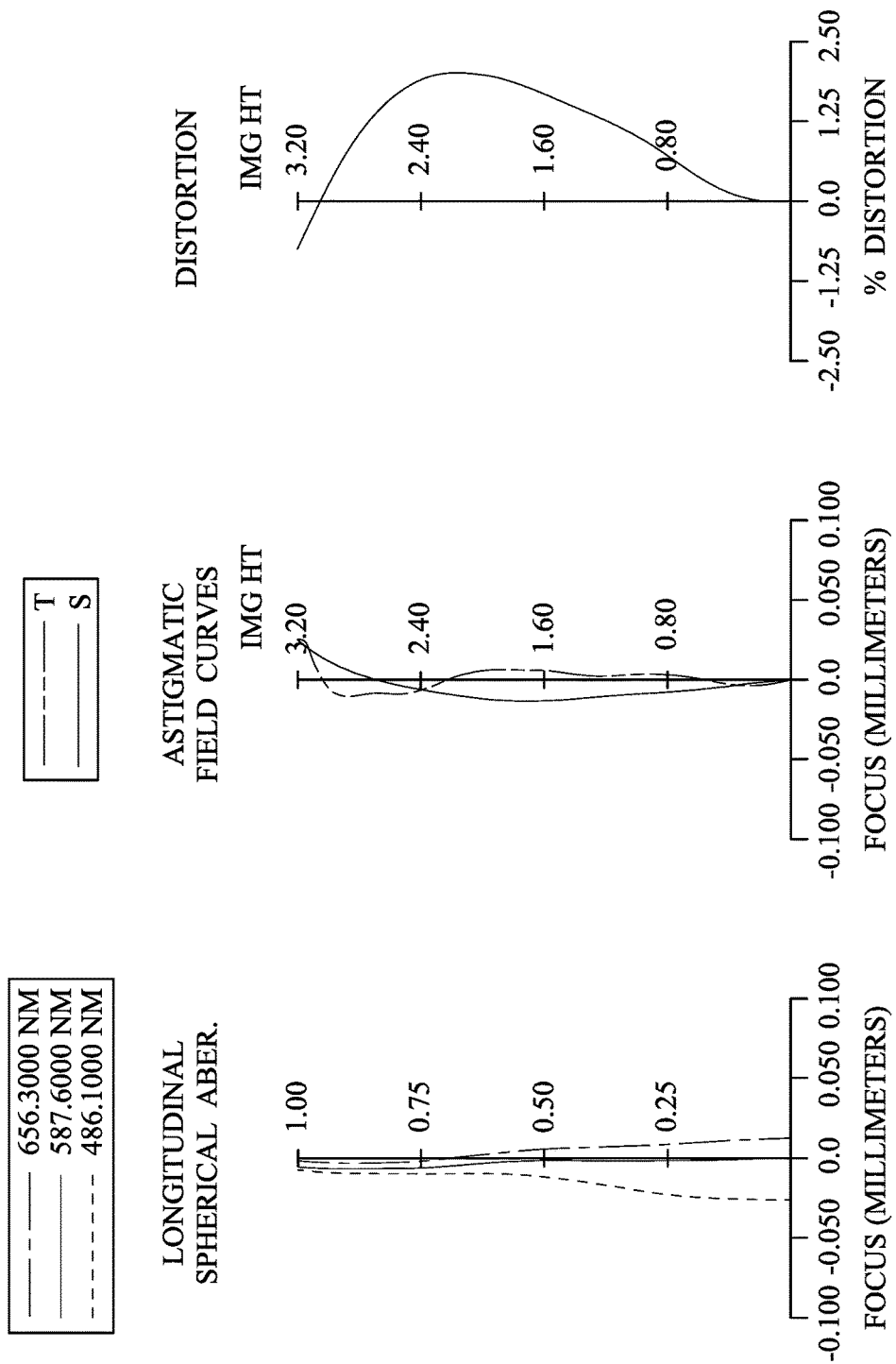
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes an image capturing lens assembly (its reference numeral is omitted) and an image sensor 790. The image capturing lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the image sensor 790 is disposed on the image surface 780 of the image capturing lens assembly. The image capturing lens assembly has a total of six lens elements (710-760).

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric. Furthermore, the object-side surface 731 of the third lens element 730 includes at least one inflection point.

The fourth lens element 740 with positive refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least two inflection points from the paraxial region thereof to an off-axial region thereof; in detail, according to the 7th embodiment, the image-side surface 752 of the fifth lens element 750 includes two inflection points from the paraxial region thereof to the off-axial region thereof.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof, and the object-side surface 761 of the sixth lens element 760 includes at least one inflection point.

The IR-cut filter 770 is made of a glass material and located between the sixth lens element 760 and the image surface 780, and will not affect the focal length of the image capturing lens assembly.

The detailed optical data of the 7th embodiment are shown in Table 13 and the aspheric surface data are shown in Table 14 below.

TABLE 13

7th Embodiment
f = 4.24 mm, Fno = 2.20, HFOV = 37.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.313 | | | | |
| 2 | Lens 1 | 1.642 ASP | 0.560 | Plastic | 1.544 | 55.9 | 4.66 |
| 3 | | 4.107 ASP | 0.068 | | | | |
| 4 | Lens 2 | 2.559 ASP | 0.248 | Plastic | 1.660 | 20.4 | −13.89 |
| 5 | | 1.923 ASP | 0.395 | | | | |
| 6 | Lens 3 | 10.839 ASP | 0.699 | Plastic | 1.544 | 55.9 | 9.95 |
| 7 | | −10.553 ASP | 0.528 | | | | |
| 8 | Lens 4 | −4.362 ASP | 0.322 | Plastic | 1.639 | 23.5 | 20.83 |
| 9 | | −3.380 ASP | 0.050 | | | | |
| 10 | Lens 5 | 2.488 ASP | 0.350 | Plastic | 1.544 | 55.9 | 73.87 |
| 11 | | 2.520 ASP | 0.404 | | | | |
| 12 | Lens 6 | 3.964 ASP | 0.392 | Plastic | 1.735 | 16.4 | −5.10 |
| 13 | | 1.846 ASP | 0.350 | | | | |
| 14 | IR-cut filter | Plano | 0.210 | Glass | 1.517 | 64.2 | — |
| 15 | | Plano | 0.425 | | | | |
| 16 | Image | Plano | — | | | | |

Reference wavelength is 587.6 nm (d-line).

TABLE 14

Aspheric Coefficients

| | Surface # | | | | | |
|---|---|---|---|---|---|---|
| | 2 | 3 | 4 | 5 | 6 | 7 |
| k = | −4.1776E−01 | −6.7990E+01 | −6.8105E+00 | −1.0373E+00 | 4.5350E+01 | 5.1524E+01 |
| A4 = | 1.2618E−02 | −7.7585E−02 | −2.2151E−01 | −1.0143E−01 | −4.7039E−02 | −3.1176E−02 |
| A6 = | 1.0304E−02 | 1.5942E−01 | 3.5754E−01 | 1.5420E−01 | −3.6627E−02 | −4.3231E−02 |
| A8 = | −7.9305E−03 | −1.1697E−01 | −2.6537E−01 | −2.4209E−02 | 1.3453E−01 | 7.9576E−02 |
| A10 = | 1.1284E−02 | 1.6777E−02 | 7.5224E−02 | −6.5314E−02 | −3.4055E−01 | −1.4792E−01 |
| A12 = | −6.4659E−03 | 2.9706E−02 | 2.8089E−02 | 6.5290E−02 | 4.3859E−01 | 1.3954E−01 |
| A14 = | 1.9194E−03 | −1.4487E−02 | −1.9802E−02 | −1.2370E−02 | −2.9766E−01 | −6.8973E−02 |
| A16 = | | | | | 8.4669E−02 | 1.4277E−02 |

| | Surface # | | | | | |
|---|---|---|---|---|---|---|
| | 8 | 9 | 10 | 11 | 12 | 13 |
| k = | −6.3008E+01 | −1.1534E+01 | −1.4554E+00 | −2.2223E+00 | −1.1426E+01 | −1.0830E+01 |
| A4 = | −8.2637E−02 | −1.3804E−01 | −1.2746E−01 | 1.2203E−02 | −2.6209E−01 | −1.4318E−01 |
| A6 = | 9.1966E−02 | 1.3609E−01 | 1.7879E−02 | −9.5863E−02 | 1.7925E−01 | 7.5055E−02 |
| A8 = | −1.0074E−01 | −7.8838E−02 | −3.4210E−02 | 6.1754E−02 | −7.2076E−02 | −2.8229E−02 |
| A10 = | 6.4058E−02 | 2.9297E−02 | 2.6613E−02 | −2.1573E−02 | 1.7045E−02 | 7.0062E−03 |
| A12 = | −2.8343E−02 | −5.7972E−03 | −7.9183E−03 | 4.1576E−03 | −2.3152E−03 | −1.0588E−03 |
| A14 = | 5.4179E−03 | 4.5233E−04 | 1.0621E−03 | −4.0463E−04 | 1.6790E−04 | 8.6620E−05 |
| A16 = | −8.9431E−05 | | −5.4496E−05 | 1.5349E−05 | −5.0463E−06 | −2.9046E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.24 | T34/T23 | 1.34 |
| Fno | 2.20 | ΣCT/ΣAT | 1.78 |

-continued

| 7th Embodiment | | | |
|---|---|---|---|
| HFOV [deg.] | 37.3 | CTmax/CTmin | 2.82 |
| N6 | 1.735 | TL/ImgH | 1.56 |
| N6x HFOV | 64.68 | (R11 + R12)/(R11 − R12) | 2.74 |
| V6/N6 | 9.45 | R9/R5 | 0.23 |
| V1/V6 | 3.41 | Σ|Pi| | 0.99 |
| V6x (f/EPD) | 36.08 | Sag62/CT6 | −1.36 |
| (V2 + V4)/2 | 21.95 | |Sag52/Sag41| | 0.69 |
| CT5/CT2 | 1.41 | f/EPD | 2.20 |
| T23/CT4 | 1.23 | | |

Furthermore, in the image capturing lens assembly according to the 7th embodiment, when a refractive power of the first lens element 710 is P1, the refractive power of the second lens element 720 is P2, the refractive power of the third lens element 730 is P3, the refractive power of the fourth lens element 740 is P4, the refractive power of the fifth lens element 750 is P5, and a refractive power of the sixth lens element 760 is P6, the following condition is satisfied: |Pi|<|P1| and |Pi|<|P6| wherein i=2, 3, 4, 5.

8th Embodiment

Figure 15:
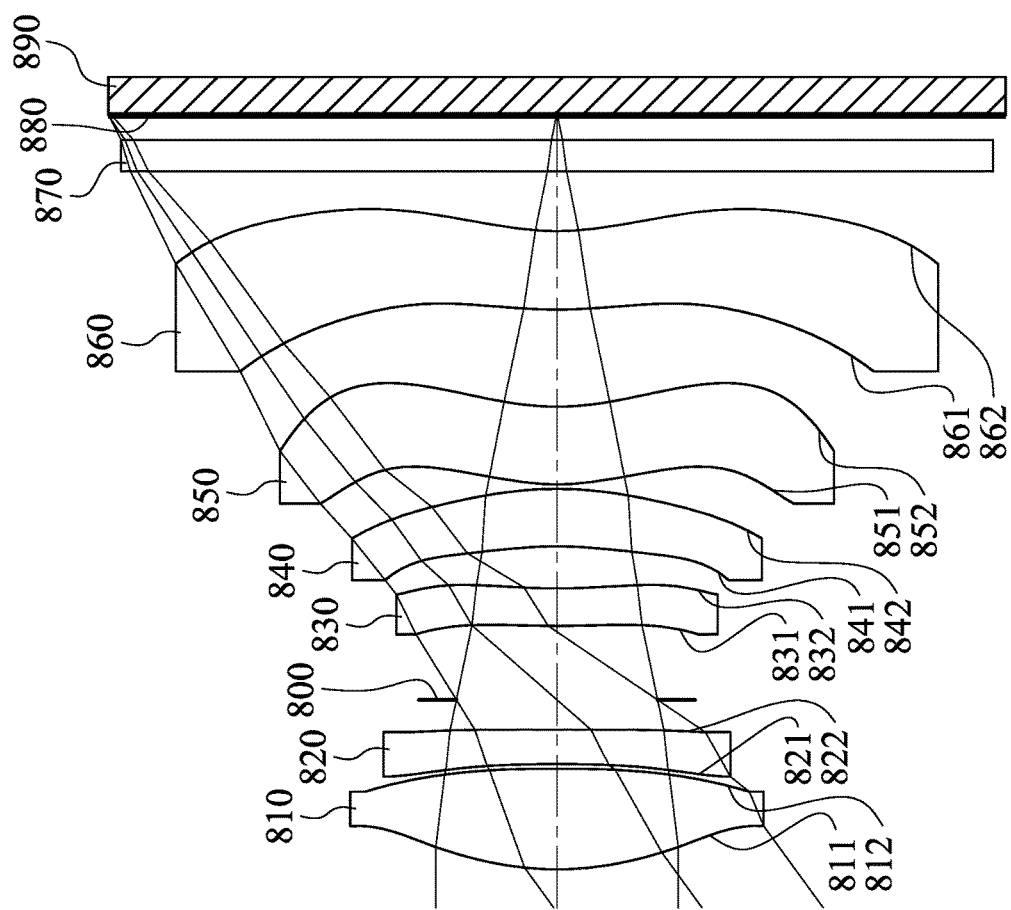
FIG. 15 is a schematic view of an image capturing apparatus according to the 8th embodiment of the present disclosure.
Figure 16:
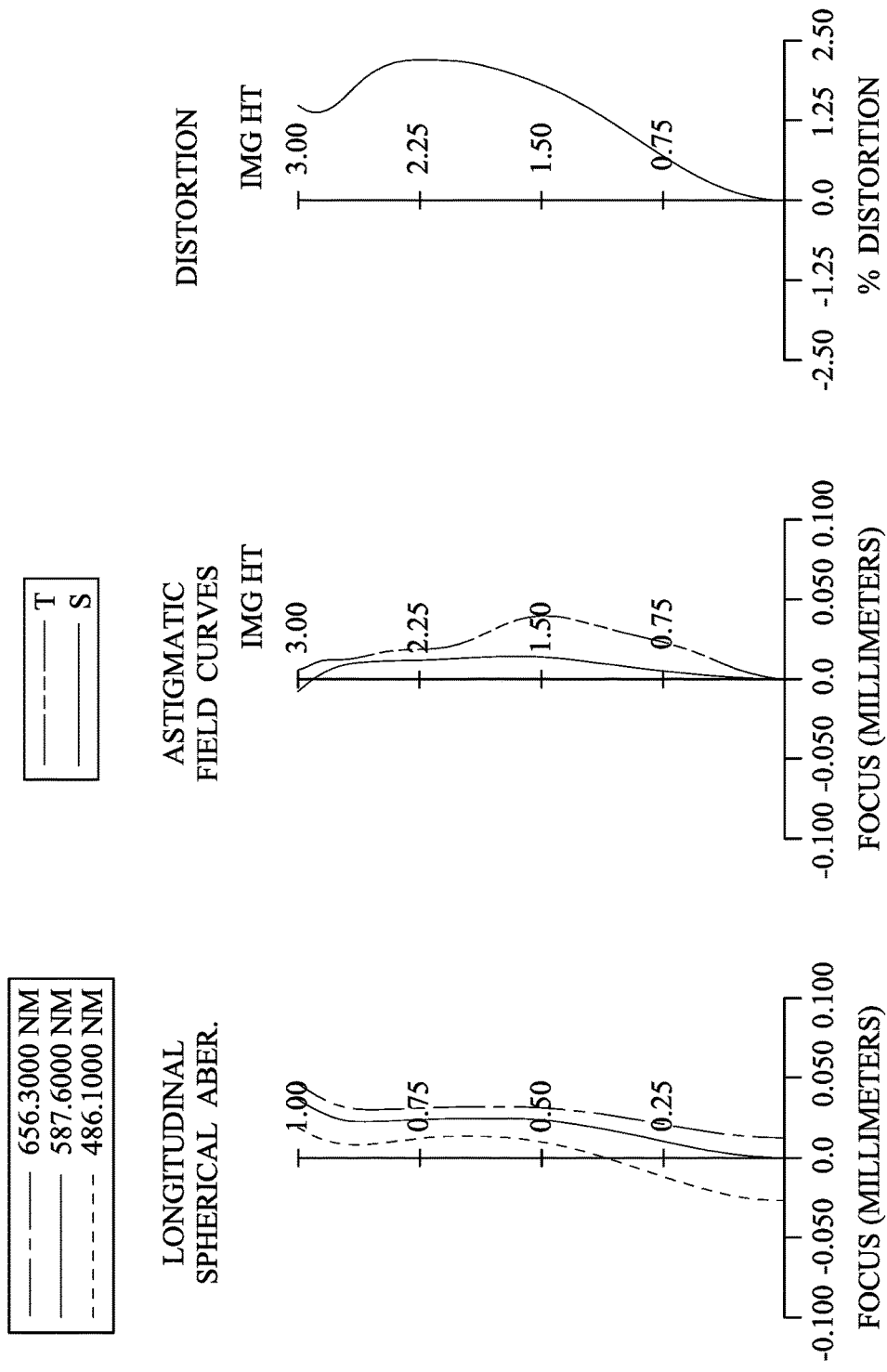
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes an image capturing lens assembly (its reference numeral is omitted) and an image sensor 890. The image capturing lens assembly includes, in order from an object side to an image side, a first lens element 810, a second lens element 820, an aperture stop 800, a third lens element 830, a fourth lens element 840, a fifth lens element 850, a sixth lens element 860, an IR-cut filter 870 and an image surface 880, wherein the image sensor 890 is disposed on the image surface 880 of the image capturing lens assembly. The image capturing lens assembly has a total of six lens elements (810-860).

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the object-side surface 831 of the third lens element 830 includes at least one inflection point.

The fourth lens element 840 with positive refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, the image-side surface 852 of the fifth lens element 850 includes one inflection point from the paraxial region thereof to an off-axial region thereof.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex shape in an off-axial region thereof, and the object-side surface 861 of the sixth lens element 860 includes at least one inflection point.

The IR-cut filter 870 is made of a glass material and located between the sixth lens element 860 and the image surface 880, and will not affect the focal length of the image capturing lens assembly.

The detailed optical data of the 8th embodiment are shown in Table 15 and the aspheric surface data are shown in Table 16 below.

TABLE 15

8th Embodiment
f = 4.05 mm, Fno = 2.50, HFOV = 36.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.122 ASP | 0.674 | Plastic | 1.544 | 55.9 | 3.74 |
| 2 | | −43.471 ASP | 0.031 | | | | |
| 3 | Lens 2 | −28.820 ASP | 0.230 | Plastic | 1.660 | 20.4 | −20.29 |
| 4 | | 25.083 ASP | 0.200 | | | | |
| 5 | Ape. Stop | Plano | 0.495 | | | | |
| 6 | Lens 3 | 6.668 ASP | 0.252 | Plastic | 1.544 | 55.9 | −28.12 |
| 7 | | 4.581 ASP | 0.281 | | | | |
| 8 | Lens 4 | −2.643 ASP | 0.385 | Plastic | 1.544 | 55.9 | 42.68 |
| 9 | | −2.494 ASP | 0.031 | | | | |
| 10 | Lens 5 | 1.726 ASP | 0.519 | Plastic | 1.544 | 55.9 | 26.54 |
| 11 | | 1.753 ASP | 0.650 | | | | |
| 12 | Lens 6 | 3.089 ASP | 0.526 | Plastic | 1.639 | 23.5 | −8.61 |
| 13 | | 1.847 ASP | 0.400 | | | | |
| 14 | IR-cut filter | Plano | 0.210 | Glass | 1.517 | 64.2 | — |
| 15 | | Plano | 0.165 | | | | |
| 16 | Image | Plano | — | | | | |

Reference wavelength is 587.6 nm (d-line).

TABLE 16

Aspheric Coefficients

| Surface # | | | | | |
|---|---|---|---|---|---|
| 1 | 2 | 3 | 4 | 6 | 7 |
| k = −7.0129E−01 | −1.1205E+01 | 9.0000E+01 | −9.0000E+01 | 1.4342E+01 | 3.7270E+00 |
| A4 = −7.9981E−03 | −3.0247E−01 | −3.1000E−01 | −9.1029E−02 | −1.7389E−01 | −1.1155E−01 |
| A6 = −8.0566E−03 | 7.1732E−01 | 8.0721E−01 | 1.7385E−01 | −4.1668E−02 | −8.9713E−02 |
| A8 = −9.2931E−03 | −9.7940E−01 | −1.2003E+00 | −3.1873E−01 | 7.3999E−02 | 9.1850E−02 |
| A10 = 2.1763E−02 | 7.4520E−01 | 1.0022E+00 | 2.8657E−01 | −1.4044E−02 | −8.3550E−02 |
| A12 = −2.2931E−02 | −2.9880E−01 | −4.3139E−01 | −8.6901E−02 | | 5.0048E−02 |
| A14 = 6.4086E−03 | 4.9305E−02 | 7.6382E−02 | | | |

| Surface # | | | | | |
|---|---|---|---|---|---|
| 8 | 9 | 10 | 11 | 12 | 13 |
| k = −9.7068E+00 | −6.0997E+00 | −8.3928E+00 | −1.1923E+00 | −3.4158E−02 | −7.8018E+00 |
| A4 = 1.6449E−01 | −2.1474E−02 | −7.4489E−02 | −1.7757E−01 | −2.1777E−01 | −9.6614E−02 |
| A6 = −1.6240E−01 | 5.7743E−02 | −3.4598E−02 | 7.5968E−02 | 1.2061E−01 | 4.7908E−02 |
| A8 = 6.6226E−02 | −6.2398E−04 | 5.5892E−02 | −3.8184E−02 | −5.9981E−02 | −2.0474E−02 |
| A10 = −8.0463E−02 | −7.0983E−02 | −4.7757E−02 | 1.3288E−02 | 2.3698E−02 | 6.0972E−03 |
| A12 = 3.2558E−02 | 4.7467E−02 | 1.7683E−02 | −3.0810E−03 | −6.1277E−03 | −1.0703E−03 |
| A14 = | −9.2918E−03 | −2.2166E−03 | 3.4172E−04 | 8.6324E−04 | 9.7679E−05 |
| A16 = | | | −6.1630E−06 | −4.9608E−05 | −3.5773E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.05 | T34/T23 | 0.40 |
| Fno | 2.50 | ΣCT/ΣAT | 1.53 |
| HFOV [deg.] | 36.0 | CTmax/CTmin | 2.93 |
| N6 | 1.639 | TL/ImgH | 1.68 |
| N6x HFOV | 58.98 | (R11 + R12)/(R11 − R12) | 3.97 |
| V6/N6 | 14.34 | R9/R5 | 0.26 |
| V1/V6 | 2.38 | Σ|Pi| | 0.59 |
| V6x (f/EPD) | 58.73 | Sag62/CT6 | −0.42 |
| (V2 + V4)/2 | 38.15 | |Sag52/Sag41| | 1.31 |
| CT5/CT2 | 2.26 | f/EPD | 2.50 |
| T23/CT4 | 1.81 | | |

Furthermore, in the image capturing lens assembly according to the 8th embodiment, when a refractive power of the first lens element 810 is P1, the refractive power of the second lens element 820 is P2, the refractive power of the third lens element 830 is P3, the refractive power of the fourth lens element 840 is P4, the refractive power of the fifth lens element 850 is P5, and a refractive power of the sixth lens element 860 is P6, the following condition is satisfied: |Pi|<|P1| and |Pi|<|P6|, wherein i=2, 3, 4, 5.

In the image capturing lens assembly according to the 8th embodiment, when the central thickness of the first lens element 810 is CT1, the central thickness of the second lens element 820 is CT2, the central thickness of the third lens element 830 is CT3, the central thickness of the fourth lens element 840 is CT4, the central thickness of the fifth lens element 850 is CT5, and the central thickness of the sixth lens element 860 is CT6, the following condition is satisfied: CT2<CT1; CT3<CT1, CT4<CT1; CT5<CT1; and CT6<CT1.

9th Embodiment

Figure 19:
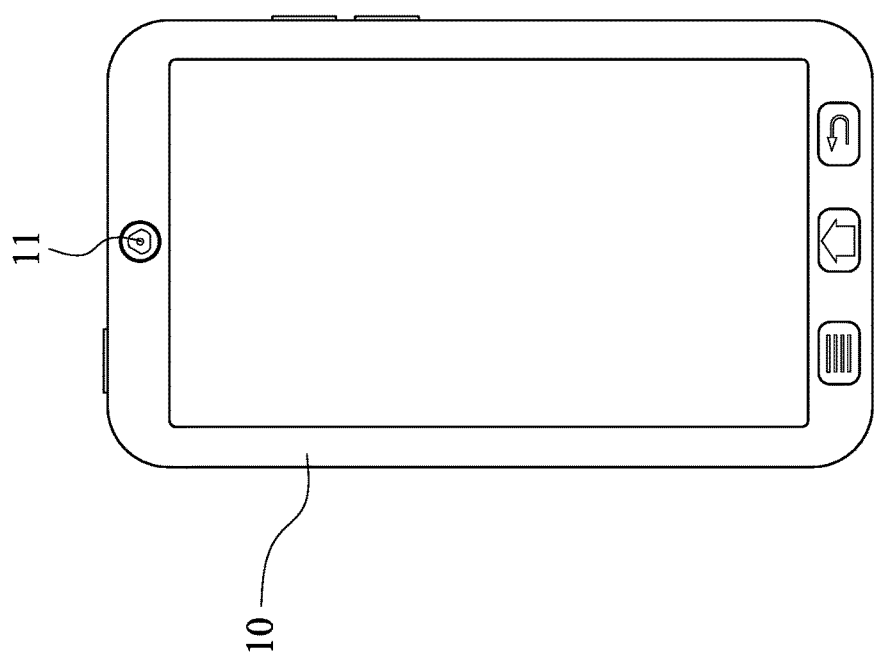
FIG. 19 is a schematic view of an electronic device according to the 9th embodiment of the present disclosure.

FIG. 19 is a schematic view of an electronic device 10 according to the 9th embodiment of the present disclosure. The electronic device 10 of the 9th embodiment is a smartphone, wherein the electronic device 10 includes an image capturing apparatus 11. The image capturing apparatus 11 includes an image capturing lens assembly (its reference numeral is omitted) according to the present disclosure and an image sensor (its reference numeral is omitted), wherein the image sensor is disposed on an image surface of the image capturing lens assembly.

10th Embodiment

Figure 20:
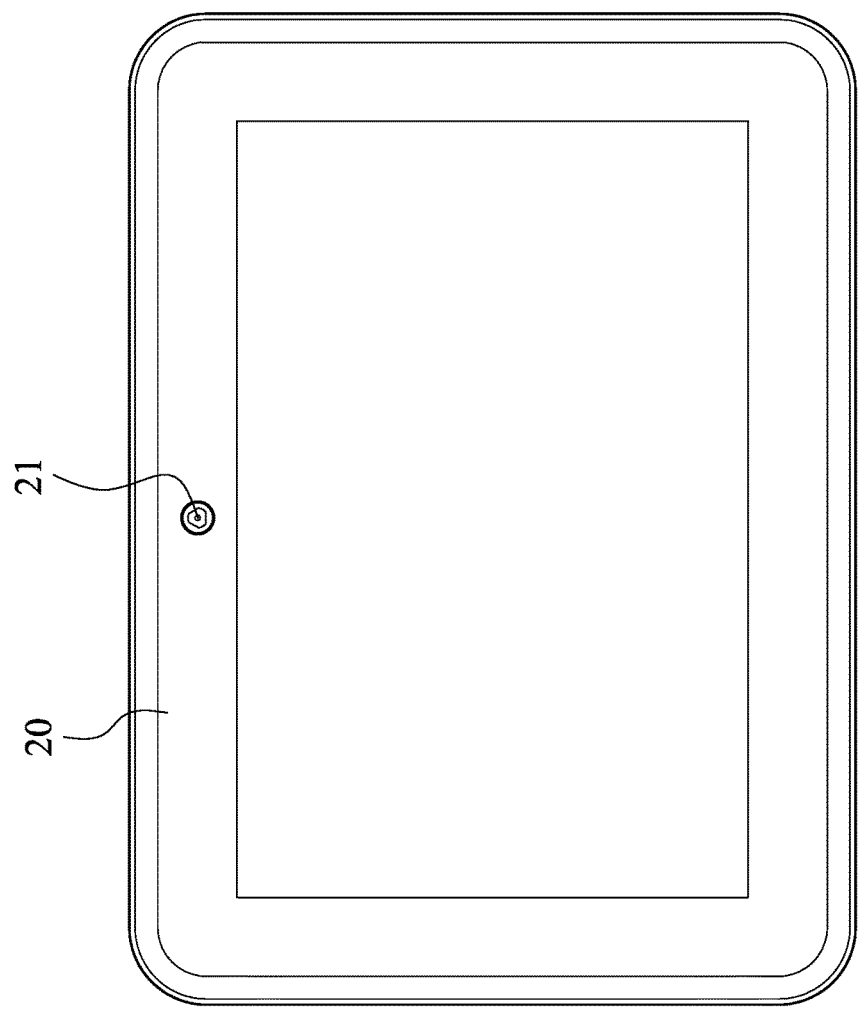
FIG. 20 is a schematic view of an electronic device according to the 10th embodiment of the present disclosure.

FIG. 20 is a schematic view of an electronic device 20 according to the 10th embodiment of the present disclosure. The electronic device 20 of the 10th embodiment is a tablet personal computer, wherein the electronic device 20 includes an image capturing apparatus 21. The image capturing apparatus 21 includes an image capturing lens assembly (its reference numeral is omitted) according to the present disclosure and an image sensor (Its reference numeral is omitted), wherein the image sensor is disposed on an image surface of the image capturing lens assembly.

11th Embodiment

Figure 21:
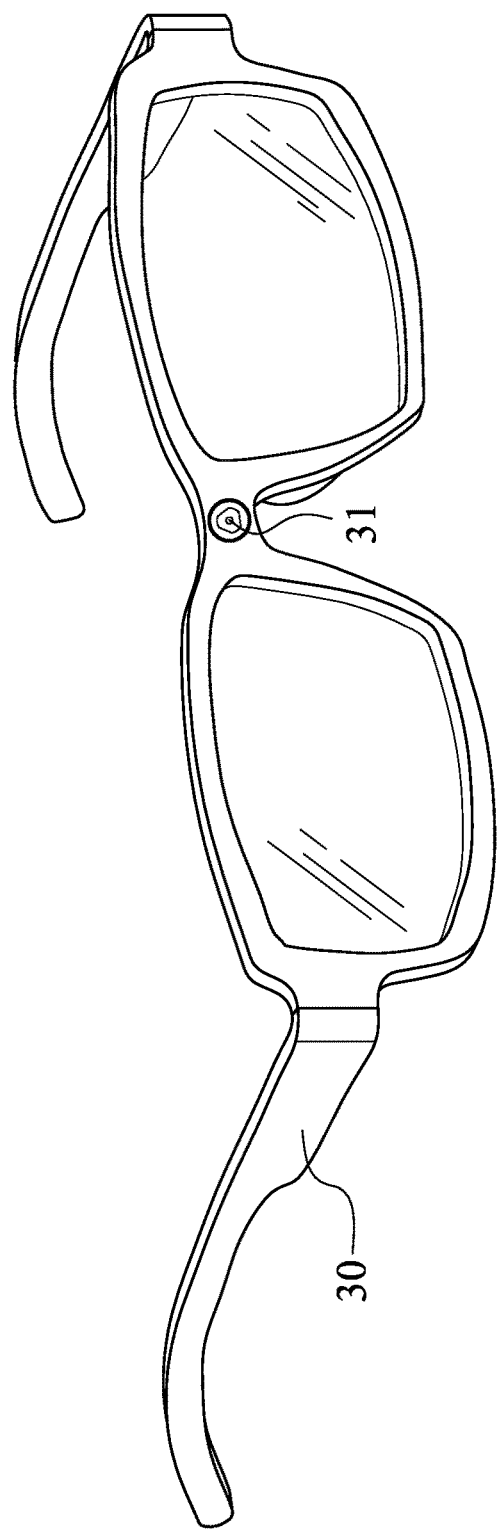
FIG. 21 is a schematic view of an electronic device according to the 11th embodiment of the present disclosure.

FIG. 21 is a schematic view of an electronic device 30 according to the 11th embodiment of the present disclosure. The electronic device 30 of the 11th embodiment is a wearable device, wherein the electronic device 30 includes an image capturing apparatus 31. The image capturing apparatus 31 includes an image capturing lens assembly (its reference numeral is omitted) according to the present disclosure and an image sensor (its reference numeral is omitted), wherein the image sensor is disposed on an image surface of the image capturing lens assembly.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising, in order from an object side to an image side:
   a first lens element with positive refractive power having an object-side surface being convex in a paraxial region thereof and an image-side surface being concave in a paraxial region thereof;
   a second lens element;
   a third lens element;
   a fourth lens element;
   a fifth lens element having an object-side surface being convex in a paraxial region thereof; and
   a sixth lens element with negative refractive power having an image-side surface being concave in a paraxial region thereof and comprising at least one convex shape in an off-axial region thereof;
   wherein the image capturing lens assembly has a total of six lens elements, a refractive index of the sixth lens element is N6, a curvature radius of an object-side surface of the sixth lens element is R11, a curvature radius of the image-side surface of the sixth lens element is R12, a focal length of the image capturing lens assembly is f, a focal length of the second lens element is f2, a focal length of the third lens element is f3, a focal length of the fourth lens element is f4, a focal length of the fifth lens element is f5, an entrance pupil diameter of the image capturing lens assembly is EPD, a distance on optical axis between the third lens element and the fourth lens element is larger than a distance on optical axis between the fifth lens element and the sixth lens element, and the following conditions are satisfied:

$1.60 < N6 < 1.77$;

$-0.40 < (R11+R12)/(R11-R12) < 7.50$;

$|f/f2|+|f/f3|+|f/f4|+|f/f5| < 1.65$; and $f/EPD < 2.0$.

2. The image capturing lens assembly of claim 1, wherein the second lens element has an image-side surface being concave in a paraxial region thereof, and the third lens element has an object-side surface comprising at least one inflection point.

3. The image capturing lens assembly of claim 1, wherein the fourth lens element has an object-side surface being concave in a paraxial region thereof and an image-side surface being convex in a paraxial region thereof, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the following conditions are satisfied:

$CT2 < CT1$;

$CT3 < CT1$;

$CT4 < CT1$;

$CT5 < CT1$; and $CT6 < CT1$.

4. The image capturing lens assembly of claim 1, wherein the fifth lens element has an image-side surface comprising at least two inflection points from a paraxial region thereof to an off-axial region thereof.

5. The image capturing lens assembly of claim 1, wherein a sum of central thicknesses of the lens elements of the image capturing lens assembly is $\Sigma CT$, a sum of distances on optical axis between every two of the lens elements of the image capturing lens assembly that are adjacent to each other is $\Sigma AT$, and the following condition is satisfied:

$1.30 < \Sigma CT/\Sigma AT < 2.20$.

6. The image capturing lens assembly of claim 1, wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, a maximum of CT1, CT2, CT3, CT4, CT5 and CT6 is CTmax, a minimum of CT1, CT2, CT3, CT4, CT5 and CT6 is CTmin, and the following condition is satisfied:

$2.90 < CTmax/CTmin < 7.0$.

7. The image capturing lens assembly of claim 1, wherein a central thickness of the second lens element is CT2, a central thickness of the fifth lens element is CT5, and the following condition is satisfied:

$1.25 < CT5/CT2 < 4.50$.

8. The image capturing lens assembly of claim 1, wherein a distance on optical axis between the second lens element and the third lens element is T23, a central thickness of the fourth lens element is CT4, and the following condition is satisfied:

$0.55 < T23/CT4 < 1.35$.

9. The image capturing lens assembly of claim 1, wherein a distance on optical axis between the object-side surface of the first lens element and an image surface is TL, a maximum image height of the image capturing lens assembly is ImgH, an Abbe number of the first lens element is V1, an Abbe number of the sixth lens element is V6, and the following conditions are satisfied:

$TL/ImgH < 1.75$; and $2.0 < V1/V6 < 4.0$.

10. The image capturing lens assembly of claim 1, wherein the curvature radius of the object-side surface of the sixth lens element is R11, the curvature radius of the image-side surface of the sixth lens element is R12, and the following condition is satisfied:

$0 < (R11+R12)/(R11-R12) < 3.50$.

11. The image capturing lens assembly of claim 1, wherein an Abbe number of the sixth lens element is V6, the focal length of the image capturing lens assembly is f, the entrance pupil diameter of the image capturing lens assembly is EPD, and the following condition is satisfied:

15.0<V6×(f/EPD)<60.0.

12. The image capturing lens assembly of claim 1, wherein a distance on optical axis between the second lens element and the third lens element is T23, the distance on optical axis between the third lens element and the fourth lens element is T34, and the following condition is satisfied:

0.55<T34/T23<5.50.

13. The image capturing lens assembly of claim 1, wherein a displacement in parallel with an optical axis from an axial vertex on an object-side surface of the fourth lens element to a maximum effective radius position on the object-side surface of the fourth lens element is SAG41, a displacement in parallel with the optical axis from an axial vertex on an image-side surface of the fifth lens element to a maximum effective radius position on the image-side surface of the fifth lens element is SAG52, and the following condition is satisfied:

0.10<|SAG52/SAG41|<3.20.

14. The image capturing lens assembly of claim 1, wherein a displacement in parallel with an optical axis from an axial vertex on the image-side surface of the sixth lens element to a maximum effective radius position on the image-side surface of the sixth lens element is SAG62, a central thickness of the sixth lens element is CT6, and the following condition is satisfied:

−3.0<SAG62/CT6<−1.0.

15. The image capturing lens assembly of claim 1, wherein an Abbe number of the sixth lens element is V6, the refractive index of the sixth lens element is N6, and the following condition is satisfied:

7.0<V6/N6<15.0.

16. An image capturing apparatus, comprising:
the image capturing lens assembly of claim 1; and
an image sensor, wherein the image sensor is disposed on an image surface of the image capturing lens assembly.

17. An electronic device, comprising:
the image capturing apparatus of claim 16.

18. An image capturing lens assembly comprising, in order from an object side to an image side:
a first lens element with positive refractive power having an object-side surface being convex in a paraxial region thereof;
a second lens element;
a third lens element;
a fourth lens element;
a fifth lens element; and
a sixth lens element with negative refractive power having an image-side surface being concave in a paraxial region thereof and comprising at least one convex shape in an off-axial region thereof;
wherein the image capturing lens assembly has a total of six lens elements, a refractive index of the sixth lens element is N6, a curvature radius of an object-side surface of the sixth lens element is R11, a curvature radius of the image-side surface of the sixth lens element is R12, a focal length of the image capturing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a distance on optical axis between the second lens element and the third lens element is T23, a distance on optical axis between the third lens element and the fourth lens element is T34, and the following conditions are satisfied:

1.60<N6<1.77;

−0.70<(R11+R12)/(R11−R12)<7.50;

|f/fi|<|f/f1| and |f/fi|<|f/f6|, wherein i=2,3,4,5;

|f/f2|±|f/f3|±|f/f4|±|f/f5|<1.20; and 0.55<T34/T23<5.50.

19. The image capturing lens assembly of claim 18, wherein the object-side surface of the sixth lens element comprises at least one inflection point.

20. The image capturing lens assembly of claim 18, wherein a curvature radius of an object-side surface of the third lens element is R5, a curvature radius of an object-side surface of the fifth lens element is R9, and the following condition is satisfied:

−0.20<R9/R5<2.50.

21. The image capturing lens assembly of claim 18, wherein a sum of central thicknesses of the lens elements of the image capturing lens assembly is ΣCT, a sum of distances on optical axis between every two of the lens elements of the image capturing lens assembly that are adjacent to each other is ΣAT, and the following condition is satisfied:

1.30<ΣCT/ΣAT<3.10.

22. The image capturing lens assembly of claim 18, wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, a maximum of CT1, CT2, CT3, CT4, CT5 and CT6 is CTmax, a minimum of CT1, CT2, CT3, CT4, CT5 and CT6 is CTmin, and the following condition is satisfied:

2.65<CTmax/CTmin<10.0.

23. The image capturing lens assembly of claim 18, wherein the distance on optical axis between the second lens element and the third lens element is T23, a central thickness of the fourth lens element is CT4, and the following condition is satisfied:

0.45<T23/CT4<1.81.

24. The image capturing lens assembly of claim 18, wherein the refractive index of the sixth lens element is N6, a half of a maximum field of view of the image capturing lens assembly is HFOV, and the following condition is satisfied:

64.0 degrees<N6×HFOV<80.0 degrees.

25. The image capturing lens assembly of claim 18, wherein a displacement in parallel with an optical axis from an axial vertex on an object-side surface of the fourth lens element to a maximum effective radius position on the object-side surface of the fourth lens element is SAG41, a displacement in parallel with the optical axis from an axial vertex on an image-side surface of the fifth lens element to a maximum effective radius position on the image-side surface of the fifth lens element is SAG52, and the following condition is satisfied:

$0.10 < |SAG52/SAG41| < 1.80.$

26. The image capturing lens assembly of claim 18, wherein an Abbe number of the second lens element is V2, an Abbe number of the fourth lens element is V4, an Abbe number of the sixth lens element is V6, the refractive index of the sixth lens element is N6, and the following conditions are satisfied:

$(V2+V4)/2 < 30.0$; and $7.0 < V6/N6 < 15.0.$

27. The image capturing lens assembly of claim 18, wherein the focal length of the image capturing lens assembly is f, an entrance pupil diameter of the image capturing lens assembly is EPD, and the following condition is satisfied:

$f/EPD < 2.0.$

* * * * *

UNITED STATES PATENT AND TRADEMARK OFFICE
CERTIFICATE OF CORRECTION

PATENT NO. : 10,627,602 B2
APPLICATION NO. : 15/436980
DATED : April 21, 2020
INVENTOR(S) : Chun-Che Hsueh and Shu-Yun Yang It is certified that error appears in the above-identified patent and that said Letters Patent is hereby corrected as shown below:

In the Claims

Column 42, Line 15 (Claim 18), delete "$|f/f2|\pm|f/f3|\pm|f/f4|\pm|f/f5| < 1.20$" and insert therefore --$|f/f2|+|f/f3|+|f/f4|+|f/f5| < 1.20$--.

Signed and Sealed this
Seventh Day of July, 2020

Andrei Iancu
*Director of the United States Patent and Trademark Office*